US006238516B1

(12) United States Patent
Watson et al.

(10) Patent No.: US 6,238,516 B1
(45) Date of Patent: May 29, 2001

(54) SYSTEM AND METHOD FOR CLEANING, PROCESSING, AND RECYCLING MATERIALS

(76) Inventors: Dana L. Watson, 1921 10th St., Wichita Falls, TX (US) 76301; Russell Harris Poy, 60 Elmwood Dr., Destrehan, LA (US) 70047; Christopher Mark Kulakowski, 3013 Angelique Dr., Violet, LA (US) 70092; Daniel Brian Mulligan, 18827 NE. 146$^{th}$ Way, Woodinville, WA (US) 98072

( * ) Notice: Subject to any disclaimer, the term of this patent is extended or adjusted under 35 U.S.C. 154(b) by 0 days.

(21) Appl. No.: 08/391,201

(22) Filed: Feb. 21, 1995

Related U.S. Application Data

(63) Continuation-in-part of application No. 08/343,200, filed on Nov. 22, 1994, now Pat. No. 5,567,245, and a continuation-in-part of application No. 08/029,898, filed on Mar. 11, 1993, now abandoned, which is a continuation-in-part of application No. 07/655,300, filed on Feb. 14, 1991, now Pat. No. 5,225,045.

(51) Int. Cl.$^7$ ........................................................ D21C 5/02
(52) U.S. Cl. .................................................. 162/8; 162/57
(58) Field of Search .............................. 241/DIG. 38, 21, 241/24.1, 24.11, 94, 79.2, 79.3; 162/4, 55, 60, 26, 29, 30.11, 41, 8, 56, 57; 134/27, 28, 29, 30; 521/40; 68/181 R, 5 D, 142, 181 D, 58, 13 R; 8/156

(56) References Cited

U.S. PATENT DOCUMENTS

| 46,030 | 1/1865 | Sellers . |
|---|---|---|
| 910,881 | * | 1/1909 | King . |

(List continued on next page.)

FOREIGN PATENT DOCUMENTS

| 2651198 | 5/1977 | (DE) . | |
|---|---|---|---|
| 1422489 | 1/1976 | (GB) . | |
| 2122111 | 1/1984 | (GB) . | |
| 3199477 | 12/1989 | (JP) . | |
| 9207995 | 5/1992 | (WO) | ................................... 162/189 |
| WO95/24967 | 9/1995 | (WO) . | |
| WO96/19612 | 6/1996 | (WO) . | |
| WO96/19613 | 6/1996 | (WO) . | |

OTHER PUBLICATIONS

Yamaguchi, M., JP850297170, Jul. 11, 1987.
Deinking of Wastepaper, Tappi Nonograph Series No. 31 Mack Printing Co. (Easton, Pa.) 1967 pp. 32 and 43–46.
Pulp and Paper Manufacture, Preparation of Stock for Paper Making, vol. 2, McGraw Hill (New York, N. Y.) 1951 pp. 4–8 and 25–28.
Webster's Third New International Dictionary, Chicago, Encyclopedia Britannica, Inc (1976) pp. 2579,428,2366 and 1018.
76032 CBW Batch Washing System, Pillerin Milnor Corporation, 1984.
66/44 FLT Tilting Washing/Extractor, Washex Machinery Corp., 1990.
"Report on Disposable Diaper Recycling Program" Final Report to Procter & Gamble Company, Apr. 29, 1991, by Arthur D. Little, Inc., Acron Park, Cambridge, Mass.

Primary Examiner—Brenda A. Lamb
(74) Attorney, Agent, or Firm—Geoffrey A. Mantooth

(57) ABSTRACT

Washing machines are uiized to recycle plastic and cellulose from disposed diapers. The disposed diapers are loaded into a washing machine and, while being agitated, are washed in water, alkali and soap. During washing, the cellulose becomes separated from the plastic. The cellulose is drained out of the washing machine with the water, leaving the plastic in the washing machine. A pump transfers the cellulose and water to another washing machine for furter cleaning. In addition, other products, such as milk cartons and drink boxes, newspaper, and office waste paper, can be processed.

37 Claims, 12 Drawing Sheets

U.S. PATENT DOCUMENTS

| | | |
|---|---|---|
| 1,761,159 | 6/1930 | Sharples . |
| 1,798,459 | 3/1931 | Elmore et al. . |
| 2,083,884 | 6/1937 | Wells ................................... 162/57 |
| 2,700,287 | 1/1955 | Sulzmann ......................... 68/181 R |
| 2,743,178 | 4/1956 | Krodel ..................................... 162/4 |
| 2,916,216 | 12/1959 | Altram et al. ........................ 162/57 |
| 3,080,252 | 3/1963 | Freier et al. ........................... 117/18 |
| 3,189,516 | 6/1965 | Duchange ............................... 162/6 |
| 3,392,083 | 7/1968 | Illingworth ............................. 162/5 |
| 3,833,465 | 9/1974 | Cambell ................................ 162/55 |
| 3,890,220 | 6/1975 | Anderson ................................ 209/3 |
| 3,909,397 | 9/1975 | Aldinger ................................. 209/3 |
| 4,000,031 | 12/1976 | Acobas ..................................... 162/4 |
| 4,134,556 | 1/1979 | Ehrlich et al. ...................... 241/79.3 |
| 4,162,186 | 7/1979 | Wood ...................................... 160/5 |
| 4,236,393 | 12/1980 | Katzfey . |
| 4,238,337 | 12/1980 | Peters et al. ........................ 210/179 |
| 4,256,837 | 3/1981 | Fluri et al. .......................... 435/167 |
| 4,303,501 | 12/1981 | Steffens ................................... 209/2 |
| 4,305,507 | 12/1981 | Wittkopf ................................. 209/3 |
| 4,332,638 | 6/1982 | Mauer et al. ............................ 162/4 |
| 4,360,439 | 11/1982 | Calmanti et al. ....................... 162/5 |
| 4,538,767 | 9/1985 | Pimley ................................ 241/793 |
| 4,607,509 | 8/1986 | Stoll ........................................ 68/27 |
| 4,687,146 | 8/1987 | Sundman ........................... 241/79.3 |
| 4,760,717 | 8/1988 | Ponzielli ........................... 68/181 R |
| 4,838,995 | 6/1989 | Klausen ................................ 162/18 |
| 4,915,830 | 4/1990 | Mackay et al. ...................... 210/209 |
| 4,959,530 | 9/1990 | Tsutsumi ................................ 134/7 |
| 4,971,449 | 11/1990 | Hendren ................................. 68/58 |
| 5,053,140 | 10/1991 | Hurst .................................. 210/704 |
| 5,084,135 | 1/1992 | Brooks et al. .......................... 162/4 |
| 5,225,045 | 7/1993 | Watson . |
| 5,322,255 | 6/1994 | Cina . |
| 5,324,389 | 6/1994 | Spencer .................................. 162/4 |
| 5,429,311 | 7/1995 | Cina et al. . |
| 5,558,745 * | 9/1996 | Conway et al. ....................... 162/60 |

* cited by examiner

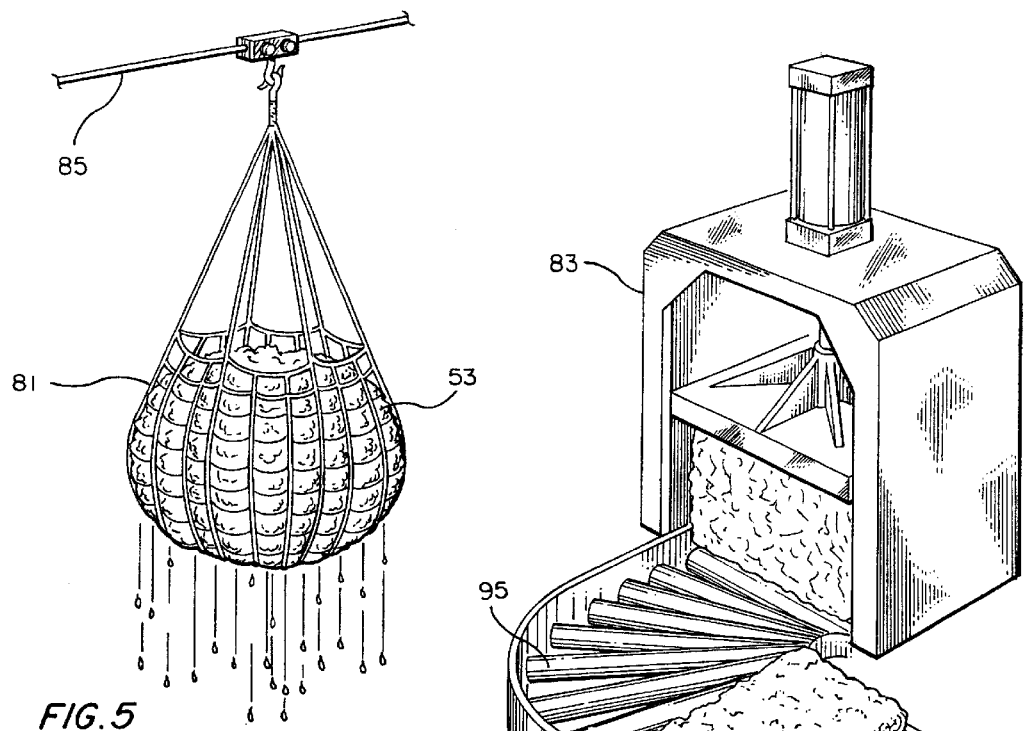
FIG.5
FIG.6
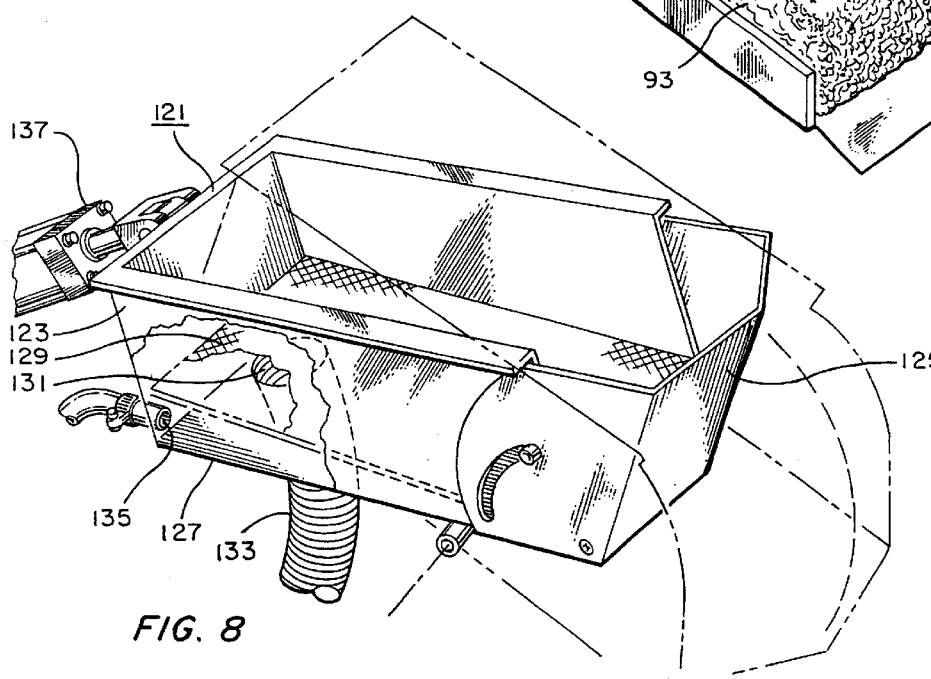
FIG. 8

SYSTEM AND METHOD FOR CLEANING, PROCESSING, AND RECYCLING MATERIALS

SPECIFICATION

This application is a continuation-in-part of application Ser. No. 08/343,200, filed Nov. 22, 1994, now U.S. Pat. No. 5,567,245 and is also a continuation-in-part of application Ser. No. 08/029,898, filed Mar. 11, 1993, now abandoned each of which is a continuation-in-part of application Ser. No. 07/655,300, filed Feb. 14, 1991, now U.S. Pat. No. 5,225,045.

FIELD OF THE INVENTION

The present invention relates to systems and methods for cleaning, processing, and/or recycling materials from disposed or disposable products such as diapers, newspapers, office paper, milk cartons, drink or juice boxes, and glass and rubber products.

BACKGROUND OF THE INVENTION

Disposable diapers are primarily made up of plastic and cellulose. The plastic provides a moisture-proof lining on the outside of the diaper and the cellulose provides the bulky absorbent media on the inside. The diaper essentially provides a bag that is worn by a human being. The cellulose holds and retains all moisture, while the plastic ensures that there is no leakage through the bag. Some disposable diapers are marketed under names such as "ultra thin" or the like. These diapers use less cellulose and include a super absorbent molecule (SAM), which absorbs as much as one thousand times its own mass in water.

Disposable diapers have become immensely popular. Disposable diapers of course are used just once and thrown away after they have been soiled with waste material. The ultimate disposal of the diapers typically involves transporting them to the local landfill. Environmentalists decry this disposal of diapers as being wasteful both in the manufacture and disposal of the diapers. The manufacture of disposable diapers requires forest products to obtain the necessary cellulose, while the disposal of the diapers utilizes valuable landfill space. Many communities around the country are seeing the exhaustion of their landfill space in conjunction with the political difficulty of finding new landfill space. Thus, there is a real need to reclaim the materials in disposable diapers.

The same can also be said of newspapers, which are read and then thrown away. Recycling of newsprint from newspapers has been going on for some time. There is also a need to recycle the paper found in disposed products such as office waste. Such products include writing paper, typing paper, copier paper, and paper from printers (such as used in conjunction with computers). A typical first step in recycling materials such as newsprint is cleaning to remove any contaminants. In the case of newsprint, the paper is cleaned to remove ink. Prior art methods of recycling newsprint involves soaking the newsprint in vats. The newsprint is then transferred to other, successively cleaner vats. Unforttmately, the ink follows the newsprint from vat to vat, making it difficult to satisfactorily clean the newsprint. Other materials, such as rubber and glass, are cleaned in the first steps of recycling.

There is also a need to recycle the materials from laminated paper goods such as milk cartons and drink or juice boxes. These goods utilize sheets of materials that include multiple layers of plastic and paper. The paper is typically interposed between layers of plastic, in essence providing some measure of waterproofing to the paper. In addition, the paper can be of a high wet strength, wherein the paper is difficult to separate from the plastic layers and also difficult to pulp. In the prior art, there is Ponzielli, U.S. Pat. No. 4,760,717, which uses a hydrapulper-like apparatus to process such goods. Ponzielli acts like a blender to shred the goods during processing. Such shredding diminishes the commercial value of the recycled materials.

SUMMARY OF THE INVENTION

It is a object of the present invention to provide a system and a method for recycling materials, such as plastic and cellulose, from disposed products such as disposable diapers.

It is a further object to recycle products containing plastic and cellulose by separating the plastic and other noncellulose materials from the cellulose and cleaning the materials.

It is a further object of the present invention to provide a method for cleaning soiled wood pulp goods such as cellulose and newsprint from newspapers and inked or soiled paper (such as office paper).

Still another object of the present invention is to provide a method for cleaning rubber goods, such as used tires, for recycling.

Still another object of the present invention is to provide a method for cleaning glass objects for recycling.

Still another object of the present invention is to provide a method for processing materials from laminated paper goods such as milk cartons and drink boxes.

Still another object of the present invention is to provide a method for composting organic waste such as food and yard waste.

The method of the present invention recycles cellulose material and noncellulose material such as plastic from disposed products. First and second washing machines, which are suitable for washing textile goods, are provided for washing the disposed products. The disposed products, water, alkali and a surfactant are loaded into the first washing machine. The disposed products are then agitated in the first washing machine so as to separate the cellulose material from the noncellulose material. The cellulose material and water are drained out of the first washing machine while retaining the noncellulose material inside of the first washing machine. The noncellulose material is washed in the first washing machine until the noncellulose material is clean. The cellulose material is transferred to the second washing machine and washed therein with water, alkali and soap until the cellulose material is clean.

The system of the present invention recycles cellulose material and noncellulose from disposed products. The system includes a first washing machine, a second washing machine and transfer means. The first washing machine is for washing goods and includes a first chamber and a first basket. The first chamber is adapted to contain water and has a drain for draining the contents of the first chamber. The first basket is contained in the first chamber and is adapted to contain the products. The first basket has openings so as to pass a mixture of the cellulose material and water therethrough and so as to retain the noncellulose inside of the first basket. The first basket is movable so as to agitate the products inside thereof. The second washing machine is also for washing goods and includes a second chamber and a second basket. The second basket is contained in the second chamber. The second chamber is adapted to contain water and has a drain for draining the contents of the second chamber. The second basket has openings with smaller openings than the openings of the first basket so as to pass water therethrough while retaining the cellulose material therein. The second basket is movable so as to agitate the contents thereof The second washing machine has input means for receiving said cellulose material into said second washing machine. The transfer means is for transferring the mixture of cellulose material and water from the first washing machine to the second washing machine input means. The transfer means has an input that is connected to the first chamber drain and has an output that discharges to the second chamber input means.

In one aspect, the system of the present invention provides that the first basket is lined with a first mesh, which first mesh provides the appropriate sized first basket perforations so as to pass a mixture of said cellulose material and water therethrough while retaining said plastic inside of said first basket. The second basket is lined with a second mesh, which second mesh provides the appropriate sized second basket perforations so as to pass water therethrough while retaining said cellulose material inside of said second basket.

With the present invention, the primary materials making up disposable diapers and other cellulose type products are recovered and cleaned for subsequent use. Disposable diapers are made up of cellulose and a plastic barrier for holding moisture and waste material inside of the diaper. Soiled disposed diapers are first washed in a first washing machine so as to separate the plastic and cellulose from each other. The cellulose drains out of the first washing machine with the water and waste material. The plastic stays in the first washing machine and is cleaned therein. The cellulose, water and waste material are transferred to a second washing machine which cleans the cellulose of all waste material. The waste material drains out of the second washing machine with the wash water, while the cellulose is retained in the second washing machine. The plastic and cellulose are cleaned with water, alkali and soap. Cleaned plastic and cellulose are thus produced from soiled disposed diapers.

There is also provided a method of cleaning soiled wood pulp goods such as cellulose and newspaper. The method provides a washing machine suitable for washing textiles, and having a basket that has openings so as to pass water therethrough while retaming the goods inside of the basket. The goods, water, alkali and soap are loaded into the basket. The basket is moved so as to agitate the goods, wherein the goods are cleaned of contaminants such as ink. The water, alkali, soap and contaminants are drained from the basket through the openings while retaining the goods inside of the basket. The goods are then rinsed in the basket with water.

There is also provided a method of cleaning rubber goods such as used tires. The method shreds the rubber goods to produce rubber particles. A washing machine that is suitable for washing textiles and having a basket that has openings so as to pass water therethrough while retaining the rubber particles therein is provided. The rubber particles, water, alkali and surfactant are loaded into the basket. The basket is moved so as to agitate the rubber particles until the particles are cleaned. The water is drained from the basket through the openings while retaining the rubber particles inside of the basket.

There is also provided a method for processing waste material such as food and yard waste. A washing machine is provided that is suitable for washing textiles. The washing machine has a basket that has openings so as to pass water but retain the waste material. The waste material, water and either acid or alkali are loaded into the basket. The basket is moved so as to agitate the waste material. While moving the waste material, air is injected into the basket.

BRIEF DESCRIPTION OF THE DRAWINGS

FIG. 5 is an isometric view of a sling for draining cleaned cellulose.

FIG. 6 is an isometric view of an extractor for pressing water out of the cleaned cellulose.

FIG. 8 is a detailed view of the holding tank of FIG. 7.

DESCRIPTION OF PREFERRED EMBODIMENTS

The system and method of the present invention involves the recycling of disposed products such as disposable diapers that have been soiled with waste material. Disposable diapers typically are made up of plastic and cellulose. The plastic provides a moisture-proof barrier, while the cellulose, which is located inside of the plastic, acts as an cellulose media to hold and retain fluids.

The system and method of the present invention recycles the plastic and cellulose in the soiled diapers. The plastic and cellulose are separated from each other during an initial cleaning step. Then, the plastic and cellulose are separately cleaned of all waste material. The waste material is discharged, typically into a sewer system, for proper sanitary disposal. The cleaned cellulose and plastic can be sold and reused in manufactured products.

Figure 1:
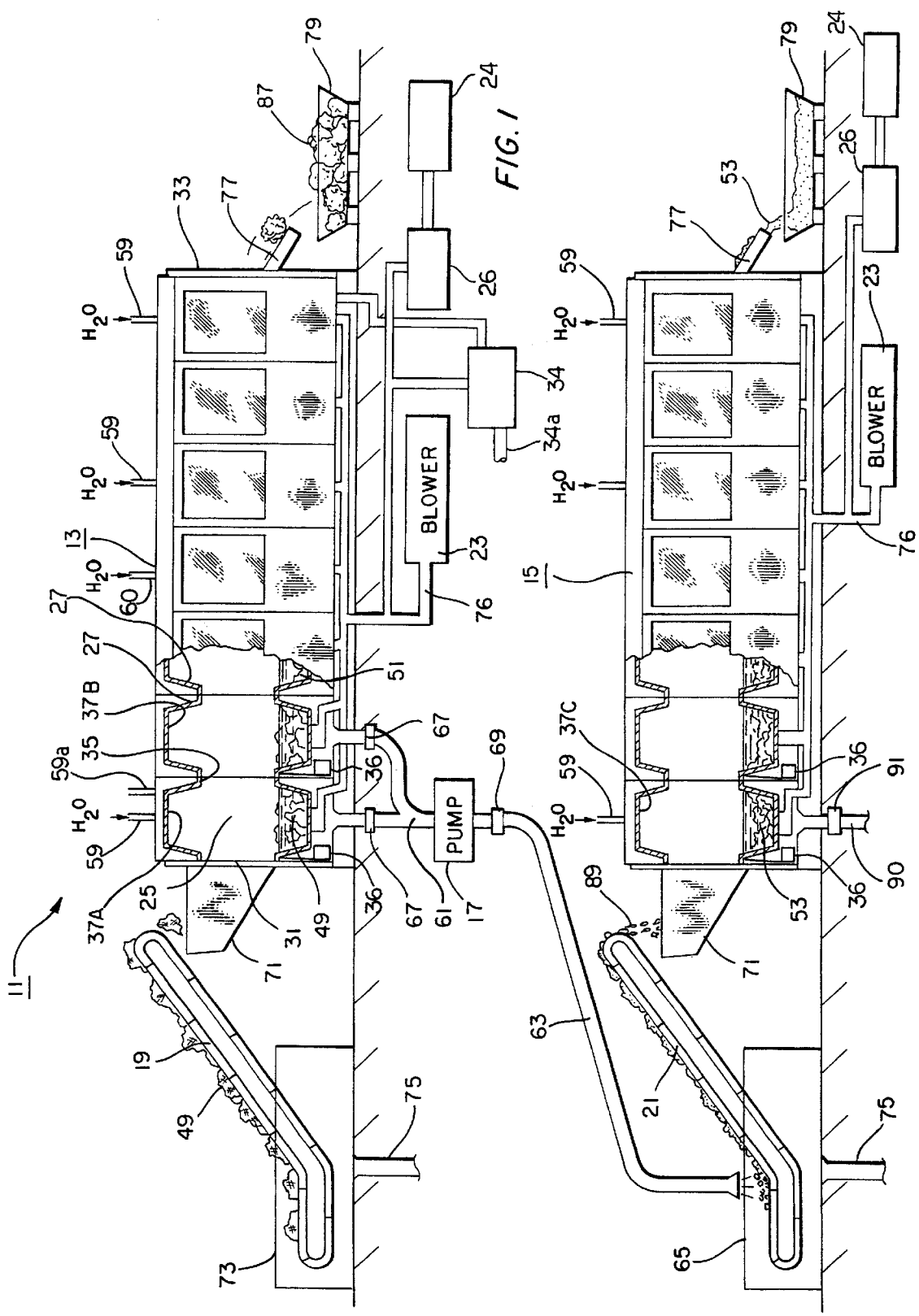
FIG. 1 is a schematic side view of the system of the present invention, in accordance with a preferred embodiment.

In FIG. 1, there is shown a schematic side view of the system 11 used to practice the method of the present invention, in accordance with a preferred embodiment. The system includes a first washing machine 13, a second washing machine 15, a transfer pump 17 between the first and second washing machines, a first infeed conveyor 19, a second infeed conveyor 21 and blowers 23.

Figure 2:
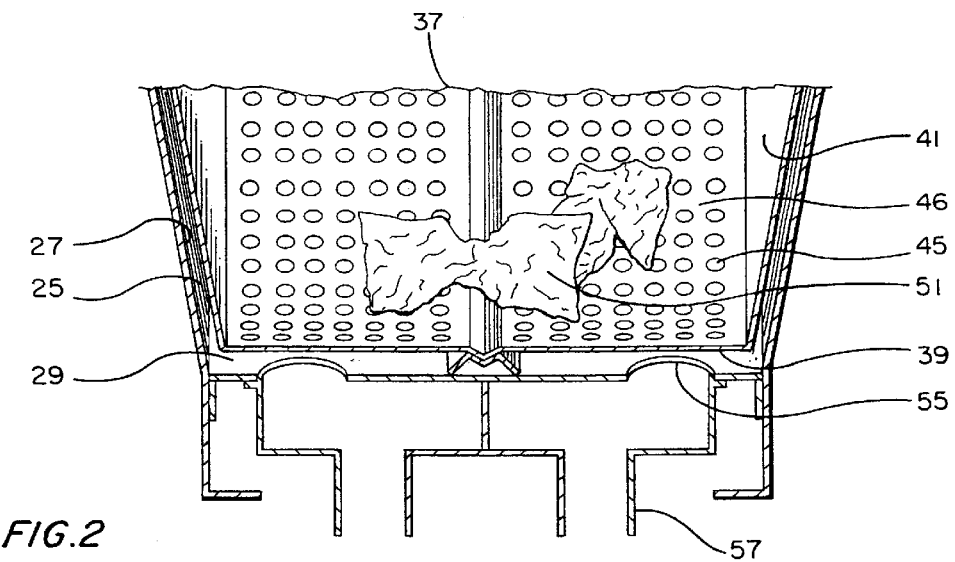
FIG. 2 is a detailed longitudinal cross-sectional view of a portion of the first basket and first chamber in the first washing machine.

The first and second washing machines 13, 15 are substantially similar to each other. The washing machines are continuous batch washing machines which are typically used for the washing of textile goods such as clothes. The washing machines are conventional and commercially available. The washing machines in the preferred embodiment are Model 76032 continuous batch washers, manufactured by Pellerin Milnor Corporation of Kenner, La., U.S.A. Each machine has plural chambers 25 for washing goods therein. The chambers 25 are waterproofed so as to hold the wash water. Referring to FIG. 2, each chamber is formed by side walls 27 and a cylindrical outer wall 29. The chambers 25 in each washing machine are arranged side-by-side in a row such that the side walls 27 are adjacent to each other. Each chamber 25 in a washing machine has a basket 37 for holding the goods to be washed. Each basket 37 has a cylindrical outside wall 39 and two side or end walls 41. A longitudinal axis extends between the side walls 41. The baskets 37 in each washing machine are arranged so that their longitudinal axes are colinear.

Each washing machine has an inlet 31 communicating with one of the end baskets and an outlet 33 communicating with the other of the end baskets. Each basket 37 communicates with its adjacent baskets by way of openings 35 in the side walls 41. The goods to be washed are loaded into the washing machines at the respective inlet 27, travel through the baskets 37 one by one while being washed, moving from chamber to chamber by way of the openings 35, and are discharged from the machines at the respective outlet 33.

Figure 3:
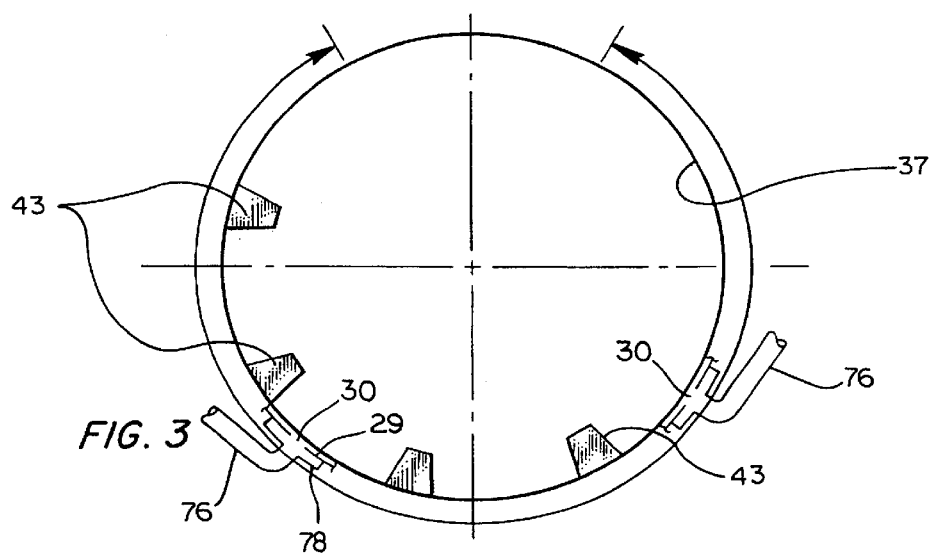
FIG. 3 is a transverse view of one of the baskets, showing the range of normal rotation and the ribs.

Each washing machine has a motor 36 for rotating the baskets 37 about their horizontal longitudinal axes within the fixed chambers 25. All of the baskets rotate in unison and in the same direction. Rotation of the baskets causes the goods inside to be agitated, thereby increasing the effectiveness of the wash. Each basket 37 is provided with ribs 43, as shown in FIG. 3, to further increase the agitation of the goods. The ribs 43 are mounted to the inside surface of the outside wall 39 and are spaced apart. As the basket 37 is rotated, the goods are lifted and dropped by the ribs 43. The basket 37 rotates about 300 degrees in one direction and then reverses to rotate 300 degrees in the other direction. This reversing of the direction of rotation further increases the agitation of the goods. The time it takes for a basket to rotate 300 degrees in one direction and 300 degrees in the other direction is about 11 seconds. The goods are transferred from one basket to the next basket in a conventional manner by rotating the baskets beyond 300 degrees. As a basket rotates beyond 300 degrees, the goods enter a conventional scoop on the basket that allow the goods to pass from the basket into the next adjoining basket (or if the basket is the last basket, then the goods pass to the outside of the washing machine).

Figure 4:
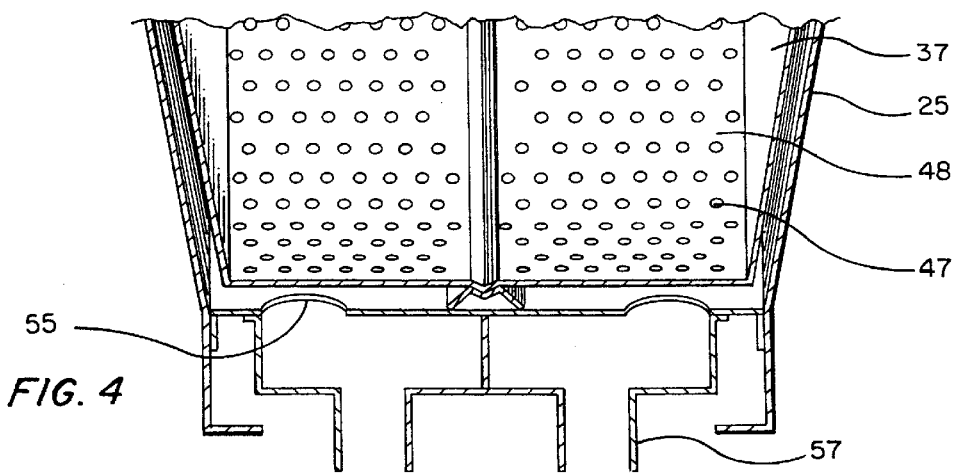
FIG. 4 is a detailed longitudinal cross-sectional view of a portion of one of the baskets and associated chamber in the second washing machine.

The outside wall 39 of each basket 37 is perforated with numerous openings 45, 47. The openings 45 allow water to be drained from the baskets. The size of the openings 45, 47 in the baskets in the first and second washing machines 13, 15 differ. In the first washing machine 13, the first two baskets 37A, 37B have openings 45 that are sized so as to retain the plastic portion of the diapers while allowing the cellulose, waste material and water to pass therethrough. It has been found that stainless steel 304 wire mesh 46, with a wire diameter of 0.012 inches and having 30 wires per inch, works satisfactorily. In the second washing machine 15, all of the baskets 37C have openings 47 that are sized to retain the cellulose inside of the basket, while passing water and waste material (see FIG. 4). It has been found that stainless steel 316 wire mesh 48, with a wire diameter of 0.010 inches and having 40 wires per inch, works satisfactorily. In FIGS. 2 and 4, the wire mesh 46, 48 and the openings 45, 47 have been shown schematically, in order to better illustrate the openings.

The baskets 37 are modified to provide the appropriate sized openings. The baskets in a washing machine are manufactured with openings of a relatively large size in the outside wall. To provide the proper size openings, the appropriate sized wire mesh is coupled to the inside surface of the outside wall 39 of a basket by welding. Alternatively, the wire mesh could be coupled to the outside wall by way of buttons, which buttons are coupled to the screen mesh and which snap fit into some of the openings in the outside wall 39.

Each chamber 25 has a drain opening 55 located at the bottom of the chamber. Drain pipes 57 lead from the drain openings 55 to the next adjacent chamber which is nearest to the inlet 31. This provides a flow of wash water from chamber to chamber which is counter to the flow of goods from chamber to chamber. The goods proceed from the inlet 31 to the outlet 33, while the wash water proceeds from the outlet to the inlet. This counterflow conserves water. Fresh or clean water inlets 59 are provided at the last chamber and may be provided at other chambers as desired. The last chamber, which is adjacent to the outlet 33 has its drain connected to a make up tank 34. Thus, the water in the last chamber is drained into the make up tank 34. The make up tank has an outlet 34a, which is connected to an inlet 59a on the first chamber. Thus, the make up tank can be used to provide water to the first chamber.

The first two chambers of the first washing machine 13 have drain pipes 61 that lead from the respective openings 55. The drain pipes 61 are both connected to the input of the pump 17. The pump 17 is a conventional, commercially available nonclogging process pump which is suitable for pumping fluids with entrained solids and fibrous materials. The output of the pump 17 is connected to a conduit 63 that discharges onto the second conveyor 21 for the second washing machine 15. The conduit 63 discharges onto the conveyor 21 at a location that is within a drain tank 65. Dump valves 67 are provided in each of the drain pipes 61 leading from the first two chambers of the first washing machine. The dump valves 67 control the draining of the fluids from the first two chambers. A check valve 69 is provided in the discharge conduit 63 from the pump. The check valve 69 prohibits back flow into the pump and the chambers.

Each washing machine 13, 15 has an input conveyor 19, 21 for loading the goods to be washed into the respective first basket. Each washing machine is provided with a funnel 71 for receiving the goods and channeling them into the inlet 31. The input conveyors 19, 21 convey the goods from draining tanks 73, 65, usually located on the ground, up to the funnels 71, where the goods are dumped. The conveyors each have a perforated surface to allow the materials to drain before being loaded into the washing machines. Each drain tank 73, 65 is provided with a floor drain 75 that is connected with the drain system. Other loading devices, such as slings or chutes, could be used in lieu of conveyors.

Each washing machine is also provided with a blower 23 for injecting air into each of the chambers of the washing machine. The blowers 23 are connected to the washing machine chambers by way of conduits 76. The air conduits 76 are connected to the chambers at locations that are beneath the respective baskets such that air bubbles up into the baskets. Referring to FIG. 3, which shows a portion of the chamber outer wall 29, the conduit 76 is connected to a plenum 78 coupled to the outer wall 29. An opening 30 is provided for air to escape from the plenum and into the chamber. The opening extends from one chamber side wall 27 to the other side wall, to distribute the air across the basket. The opening 30 is located about 45 degrees fromn the bottom of the chamber. This assures that the air flow will not be blocked by material that accumulates in the bottom of the chamber. The addition of air to the washing process initiates and speeds up the biological break down of the waste material in the disposed diapers. The blowers are conventional, commercially available units. In the preferred embodiment, the blowers provide 200 to 500 cubic feet per minute of air at about 5 psig to each washing machine.

In addition to the blowers, there is provided an ozone generator 24 for each washing machine (see FIG. 1). The ozone generator 24 is conventional and commercially available, and typically includes a spark gap enclosed in a housing. As a spark forms across the electrode gap, ozone is formed. A pump 26 transfers the ozone from the generator 24 to the respective conduit 76.

The ozone sanitizes the goods in each washing machine by killing bacteria. By using ozone, the use of chlorine bleach can be eliminated. Ozone is also introduced into the make up tank 34.

The outlet of each washing machine is made up of a ramp 77 that dumps the goods from the last chamber to a bin 79. The goods in the bin 79 of the second washing machine are transferred to a sling 81 (see FIG. 5) for draining and transport to an extractor 83 (see FIG. 6). The sling is made of mesh material, so as to allow the goods inside to drain while being transported by a cable 85. The extractor 83 is conventional and commercially available. The extractor compresses the moisture out of the goods. The extractor 83 is modified by fitting it with the same type of mesh screening as is in the second washing machine 15. As the extractor presses cellulose, the screening retains the cellulose inside of the working volume of the extractor.

The method of the present invention will now be described. Referring to FIG. 1, the disposed diapers 49 are loaded onto the first washing machine conveyor 19 at a collection point. The collection point is located within the drain tank 73 so that fluids may drain out. The disposed diapers are soiled with urine and fecal material. No preprocessing, such as shredding or opening, of the diapers is required.

The diapers 49 are loaded into the first basket 37A of the first chamber of the first washing machine 13. There, the diapers are mixed with water, alkali and soap (or a surfactant). The water is fresh, clean, cold (75 degrees F.) water from a water inlet 59 connected to the first chamber. The particular alkali used in the preferred embodiment is orthosilicate. A sufficient amount of alkali is added to raise the pH of the mixture to the desired level, between 10.5 to 14. Higher pH mixtures are required for greasier items. In practice it has been found that pH levels of 13–14 work well. The soap has a neutral pH of 7. The first basket is rotated back and forth around its longitudinal axis so as to agitate the mixture. While being agitated, the cellulose in the diapers become separated from the plastic. In addition, the process of cleaning the waste material from the cellulose and the plastic is begun. The high pH caused by the alkali makes the soil or waste release from the cellulose and the plastic much easier. The neutral soap holds the released waste material in solution in the water, preventing the waste material from reattaching to the cellulose and plastic. Air provided by the blower 23 and ozone provided by the ozone generator 24 bubble up from the bottom of the chamber to enter the basket and finther increase the agitation of the mixture, thereby assisting in the separation of the cellulose from the plastic. The increased agitation provided by the air also serves to mix the chemicals in the wash liquor faster, causing rapid displacement of the chemicals through the wash liquor and into the goods. Wash times are shortened by the blowing in of air. In addition, the air aerates the water mixture to provide favorable conditions for the biological breakdown of the waste materials and the ozone sanitizes the plastic and cellulose. Furthermore, blowing in air from the outside of the basket prevents the basket perforations from clogging with the goods that are being washed.

After the diapers have been washed for a predetermined period of time in the first basket, for example about 10 minutes, the dump valves 67 are opened, allowing the first chamber and the first basket 37A (and the second chamber and second basket 37B) to drain. The plastic 51 is retained inside of the first basket by the screen mesh, while a sludge-like fluid drains out of the basket 37A and the chamber. The sludge-like fluid is made up of water, the separated cellulose, the waste materials and the alkali and soap. The first basket, in conjunction with the other baskets in the first washing machine, is then rotated past 300 degrees so as to transfer its contents to the next basket, namely the second basket 37B. The contents of the second basket are washed as described with respect to the first basket, in order to separate any remaining cellulose from the plastic. After the wash cycle has been completed in the second basket, the dump valves 67 are opened, allowing the second basket 37B and the second chamber to drain.

Because the first washing machine 13 is of the continuous type, the first basket 37A is loaded with dirty diapers 49 each time after it empties into the drain and into the second basket. This maintains a continuous flow of materials through the system. The operation of the loading conveyors 19, 21 is intermittent, to operate only when the respective first basket needs to be loaded with goods. Both dump valves 67 operate together to open and then close in unison.

The contents of the second basket empties into the third basket. By this stage, the contents of the third basket is plastic 51 that is free of cellulose, the cellulose having been separated and drained away in the first two baskets. As the plastic continues through the remaining chambers of the first washing machine 13, the plastic is washed in warm water (130 degrees F.) and in alkali and soap to clean the plastic of all waste material.

About midway through the first washing machine 13, sand is introduced into the machine at inlet 60 so as to form a slurry of sand, plastic and water. The sand is used to assist cleaning the typically smooth plastic material. The sand provides friction points so that the agitation of the plastic by the basket and air more thoroughly cleans the plastic. The sand is of the type used for sand blasting.

The sand travels with the plastic through the first washing machine from the basket where it is introduced to the last basket. The baskets are modified by coupling 316 wire mesh to the inside of the basket wall. The mesh retains the plastic inside of the basket to prevent the smaller plastic material from entering the drain of the respective chamber.

Figure 11:
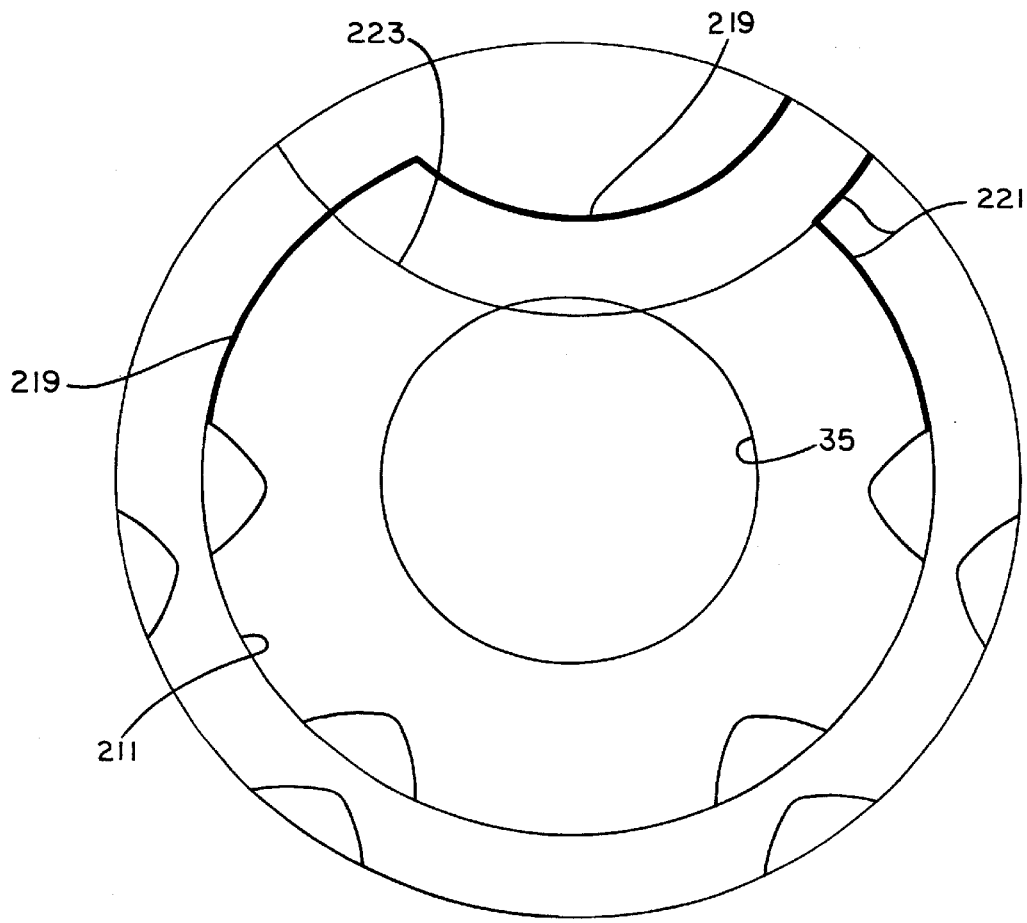
FIG. 11 is an end view of a basket arrangement in the last chamber or module of each of the continuous batch washing machines in FIG. 1.

In the last basket or module, the basket is modified to provide two layers of mesh. An inner layer of mesh is 304 mesh and during the washing cycle (and rotation of the basket) passes the sand while retaining the plastic. Surrounding the outer circumference of the inner layer of mesh is an outer layer of 316 mesh. The inner and outer layers of mesh are separated from each other by a space of 12–18 inches. (Such a nested arrangement of meshes or baskets is shown in FIG. 11 and is described in more detail herein below.) This space traps the sand, as the sand does not pass through the outer layer of mesh. In the last module then, the sand is separated from the plastic. The sand passes into the trap between the two layers. The sand is recovered from the trap and then piped back into the machine through inlet 60.

The plastic is removed from the washing machine and loaded onto a wet conveyor. The transfer from the washing machine may be either manual or by mechanical means. While on the conveyor, the plastic can be sorted according to color, etc.

One problem with prior art methods of recycling plastic has been the removal of inks from the plastic. Inks are typically used to print information on the plastic. If ihe ink is not removed, then the recycled plastic typically is colored by the inks, thereby reducing the commercial appeal of the recycled plastic. Use of sand cleans, by abrasion, the inks off of the plastic, enabling the plastic to be recycled back to its original color and free of coloration by the inks. This method of cleaning ink off of plastic applies to any type of plastic, not just the plastic components of diapers. For example, plastic candy wrappers can be deinked with this method. The plastic can be laminated with plural layers of plastic, or with layers of paper.

As an alternative to sand, a water soluble aromatic solvent, such as mineral spirits or paint remover, can be used to remove any elastic and labeling that is attached to the plastic. As still another alternative, both sand and an aromatic solvent can be used. During the washing process, a sterilizing agent may be added to sterilie the plastic. Ozone from the ozone generator 24 can be used. Alternatively, chlorine bleach may be used. However, the use of sand reduces the need for ozone or bleach.

The water-cellulose sludge that has been drained out of the first two baskets of the first washing machine 13 enters the pump 17, which then pumps it through the conduit 63 to discharge onto the second conveyor 21 loading the second washing machine 15. The loading point of the second conveyor 21 is located within the drain tank 65, wherein much of the water and associated waste material drains out of the cellulose before the cellulose is loaded into the second washing machine 15.

The water-cellulose sludge 89 is then loaded into the first basket of the second washing machine 15. The cellulose is washed in hot water (about 170 degrees F.), alkali and soap. After the washing cycle, the dump valve 91 in the first chamber is opened, allowing the first chamber to drain into the drain system by way of the drain pipe 90. The wire mesh in. the baskets of the second washing machine, which has smaller openings than the wire mesh in the first washing machine, retains the cellulose inside of the baskets. The cellulose in the first basket is then transferred to the second basket, wherein it is washed again in hot water, alkali and soap. A sufficient amount of alkali is added to raise the pH of the mixture to the desired level, between 10.5 to 14. In practice, it has been found that pH levels of 13–14 work well. In the next basket, the cellulose is rinsed with hot water and in the fourth basket, the cellulose is washed with bleach. The bleach, which can be chlorine bleach, hydrogen peroxide or oxalic acid, whitens and sanitizes the cellulose. The cellulose is then rinsed with water and then rinsed with water and sour, or sodium fluorocarbate, to bring the pH down to about 6.5 to 7.0.

The cellulose 53 is discharged from the last basket of the second washing machine 15 and is loaded into a sling 81 as shown in FIG. 5. The sling 81 is formed from a net that retains the cleaned cellulose and allows water to drain out. The sling is mounted onto a cable 85, which moves the sling from the outlet of the second washing machine 15 to the input of the extractor 83. The contents in the sling are loaded into the input of the extractor. The extractor 83 presses the cellulose into a block 93 so as to extract the water in the cellulose. Mesh screening in the extractor retains the cellulose inside while allowing water to pass through. The resulting block 93 of cellulose is then moved along a conveyor 95 from the extractor to a shipping or storage location.

After being pressed in the extractor, the cellulose can be loaded into a drier to remove any moisture. The drier is a conventional, commercially available device that has been modified. The drier has a rotating basket. The perforations of the basket are reduced by coupling the same type of mesh screen as in the second washing machine 15. The mesh screen retains the cellulose inside of the basket. The plastic can also be dried in a drier, although separately from the cellulose.

Some diapers reduce the amount of cellulose required to absorb moisture by adding a substance referred to in the industry as super absorbent molecule (SAM). It is believed that SAM is a type of acrylic polymer. SAM absorbs many times its own weight in moisture. The SAM is separated from the plastic in the first washing machine 13, along with the cellulose. The SAM is then pumped with the cellulose to the second washing machine 15. In the second washing machine, the SAM may be neutralized and removed from the cellulose. Before and after the cellulose has been washed with alkali and soap, the cellulose is washed in water and either sodium silicofluoride (or sodium fluosilicate) or sodium chloride. The sodium silicofluoride neutralizes the SAM, and allows it to be drained out of the cellulose with the rinse water.

The water that enters the drain system from the washing machines 13, 15 is of course contaminated with the waste material from the disposed diapers. This waste water can be drained into a municipal sewer system, where it will treated by the municipal sewage treatment plant. Alternatively, a dedicated sewage treatment plant can be utilized to treat the waste water from the recycling process.

An alternative method will now be described. In this method, the first washing machine 13 is provided with four modules or chambers, while the second washing machine 15 is provided with seven modules or chambers. The soiled diapers are loaded into the first basket of the first washing machine 13, which is in the first module. 100 degree Fahrenheit water and sour are also added to the first module. Enough sour is added to achieve a wash liquor pH of about 5.5. The basket is then rotated and air is blown in with the blower 23. During the washing process in the first module, the diapers stay intact and are cleaned of some of the waste material. The dirty wash water and waste material exit the module through the drain, leaving the diapers inside of the first module basket. The water and waste material exit to the sewer system.

The sour effectively reduces to a smaller size the superabsorbent molecules, or other absorbent polymer, that is located in the diapers. The wash process in the first module reduces the weight and volume of the diapers by about one-half.

After being washed in the first module, the diapers are transferred into the basket of the second module. There, they are washed in 195 degree Fahrenheit water, a neutral surfactant and sufficient alkali to raise the pH of the wash liquor to about 12.5. The diapers are agitated by basket movement and by blown in air. The diapers break apart, allowing the cellulose and the plastic to separate. Much of the cellulose exits the basket during draining, wherein the cellulose is pumped into the second washing machine. What cellulose that remains inside the basket, along with the plastic, is transferred into the basket of the third module. There, the cellulose and plastic are rinsed with water. The cellulose in the third module drains out of the respective basket, wherein it is pumped into the second washing machine. The plastic that remains in the third basket is transferred into the basket in the fourth or last module. The plastic is rinsed again with water in the last module, after which it is removed from the washing machine.

The fourth module may be fitted with an inner basket to remove insoluble contaminants from the plastic. This arrangement is shown in FIG. 11 and will be described in more detail hereinafter.

In both the first and second washing machines, the goods located inside of the baskets are agitated by a rotation of the respective basket and by blowing in air from the bottom of the module into the basket.

The cellulose that is loaded into the second washing machine 15 is washed as previously described. The superabsorbent molecule that was reduced in the first washing machine is separated from the cellulose and drained out of the basket through the basket perforations. As the cellulose proceeds through the modules of the second washing machine, more and more of the superabsorbent molecule is washed from the cellulose. Thus, the cellulose that is removed from the end of the second washing machine is cleaned and free of superabsorbent molecule.

Figure 7:
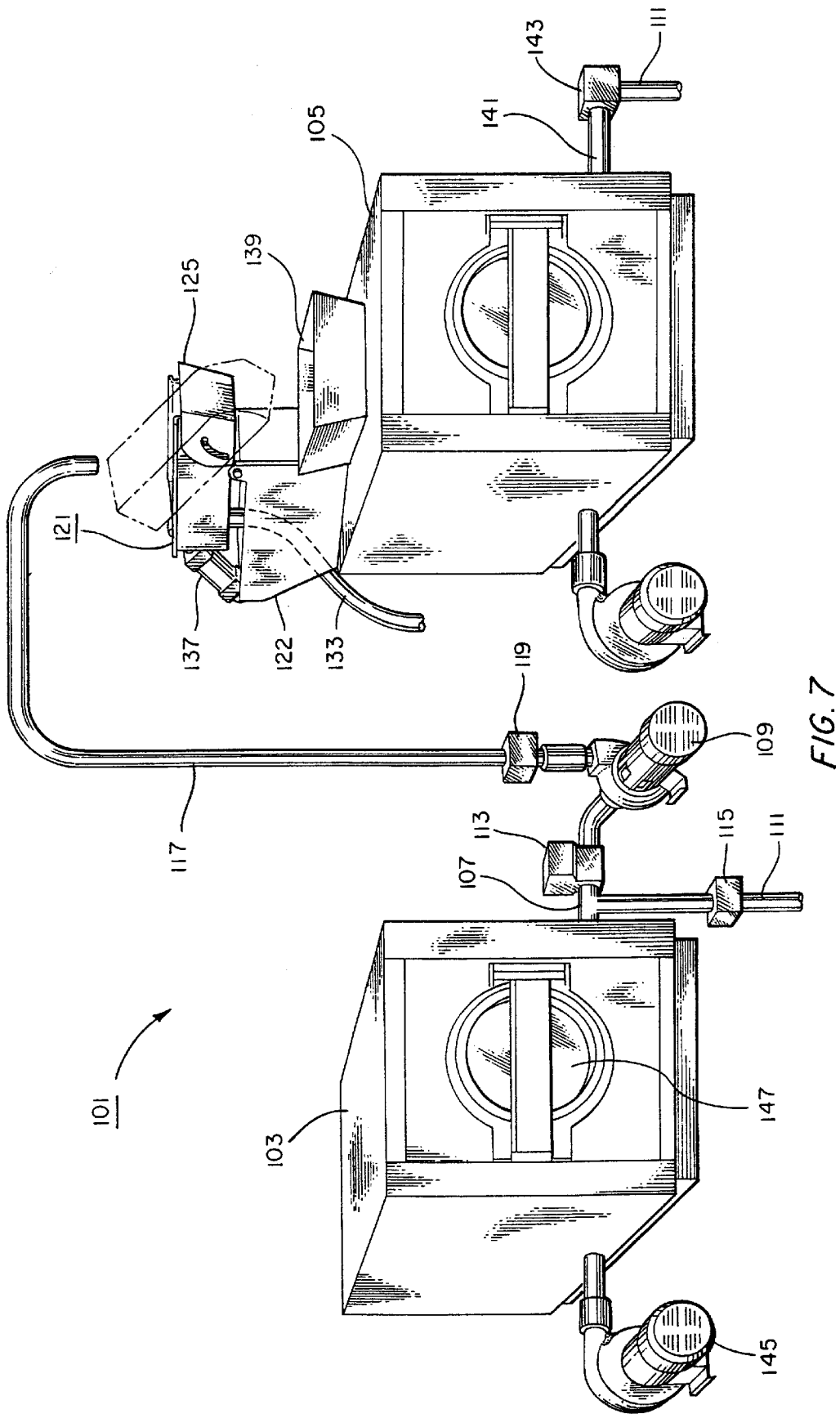
FIG. 7 is a schematic isometric view of the system of the present invention, in accordance with another embodiment.

In FIG. 7, there is shown a recycling system 101 in accordance with another embodiment. The system of FIG. 7 uses first and second washing machines 103, 105 of the batch type, rather than of the continuous type, as described above with reference to FIG. 1. Each of the first and second washing machines 103, 105 has a single basket and chamber therein. Such a system is utilized for small recycling operations, where the amount of diapers being recycled does not justify the expense of purchasing the continuous washers of FIG. 1.

The basket of the first washing machine 103 is lined with wire mesh that is similar to the wire mesh 46 in the continuous type first washing machine 13 so as to retain the plastic therein and pass the cellulose therethrough. The first washing machine 103 has a drain conduit 107 for draining away all waste water and the cellulose. The drain conduit has a T fitting, with one branch of the drain leading to a pump 109 and the other branch leading to the drain system 111. Both branches have a dump valve 113, 115 for controlling the flow therethrough. A length of conduit 117 is connected to the output of the pump 109. A check valve 119 is provided in the conduit 117 adjacent to the pump 109. The conduit 117 discharges into the top of a holding tank 121 located above the second washing machine 105.

The holding tank 121, which is shown in FIGS. 7 and 8, allows the cellulose to drain before it is loaded into the second washing machine 105. The holding tank 121 is supported above the second washing machine 105 by mounting structure 122. The holding tank 121, which is open on top, has four side walls 123, 125 and a bottom wall 127. One of the side walls operates as a door 125, moving between open and closed positions. The tank 121 has a false bottom wall 129 of wire mesh, such that there is a gap between the two bottom walls 127, 129. The wire mesh 129 allows water to drain therethrough, but retains the cellulose. A drain opening 131 is located in the bottom wall 127. A drain conduit 133 connects the drain opening 131 with the drain system. The holding tank 121 is provided with a water jet 135 beneath the wire mesh for cleaning off the wire mesh 129 with a spray of water.

The holding tank 121 is movable between a hold position and a discharge position. In the hold position, the tank 121 is substantially level so as to hold the cellulose therein; except the tank is tilted just slightly so as to locate the drain opening 131 at the lowermost position. A hydraulic piston actuator 137 moves the tank 121 to the discharge position, wherein the tank is tilted up as shown by the dash lines in FIGS. 7 and 8. In the discharge position, the door 125 swings open and allows the cellulose to fall into the basket of the second washing machine 105 by way of a loading port 139.

The second washing machine 105 is provided with the topside loading port 139, a drain conduit 141 and a dump valve 143. The basket of the second washing machine 105 is lined with wire mesh that is similar to the wire mesh 48 in the continuous type second washing machine 15 so as to retain cellulose therein while passing water and waste material therethrough. Both washing machines 103, 105 are provided with blowers 145 to aerate the goods being washed.

The ozone generators 24 and pumps 26 of FIG. 1 can also be used with the arrangement of FIG. 7 so as to provide ozone to the washing machines 103, 105.

To recycle diapers with the system of FIG. 7, a load of diapers is put into the first washing machine 103. The first washing machine has a door 147 that is used for loading and unloading. Assuming that the first washing machine 103 has a capacity of 275 pounds, the diapers are first washed in 75 degrees F. water with eight ounces of alkali for ten minutes. Then, the dump valve 113 to the pump 109 is opened and the first washing machine drains, with the pump 109 pumping the water-cellulose sludge into the holding tank 121. After draining for two minutes, the dump valve 113 is closed. Next, the contents of the first washing machine 103 are washed in warm water (130 degrees F.), with four ounces of alkali and soap for ten minutes. Then, the dump valve 113 to the pump is opened for two minutes, wherein the pump 109 transfers the sludge from the first washing machine 103 to the holding tank 121. The pump 109 operates whenever the dump valve 113 is opened. All of the cellulose in the first washing machine has by now been drained out, leaving the plastic.

Sand (and/or an aromatic solvent) is introduced into the first washing machine so as to clean the plastic of ink and other contaminants. The plastic is washed as described above, using water, a surfactant, alkali (if needed), and a sterilizing agent such as ozone and agitation (both from the moving basket and the blown in air). When the plastic is clean, the sand is separated from the plastic by a perforated basket. The sand can be separated in the first washing machine 103, if the basket has proper size perforations (such as a double wall described above with respect to the machine 13) or in another machine.

The water-cellulose sludge that has been pumped by the pump 109 is allowed to drain in the holding tank 121. The cellulose is then dumped into the second washing machine 105 by way of the loading port 139, where it is washed in water (170 degrees F.), eight ounces of alkali and soap for ten minutes. The dump valve 143 is then opened for two minutes, allowing the water and waste material to dump into the drain system 111. The cellulose is again washed in water (170 degrees F.) with ten ounces of alkali and soap for ten minutes. The dump valve 143 is opened for two minutes. The cellulose is rinsed for two minutes with water (170 degrees F.), followed by opening the dump valve for two minutes. Then, the cellulose is washed in one quart of bleach and 150 degrees F. water for ten minutes, followed by opening the dump valve for two minutes. Alternatively, ozone can be used as a sterilizing agent. The cellulose is rinsed with 130 degree F. water for two minutes, followed by opening the dump valve for two minutes. Next, the cellulose is rinsed in 110 degree F. water for two minutes, before the washing machine is dumped to the drain system for two minutes. Then, the cellulose is washed for five minutes in a rinse of 75 degree F. water and six ounces of sour. The washing machine is dumped to the drain system and the cleaned cellulose is unloaded. The cellulose is put into a sling 81 and then transferred to an extractor 83 to extract moisture, as described above.

In addition to recycling plastic and cellulose from disposed diapers, I have found that the method and system of the present invention also recycles many other disposed products and items. Before reprocessing recycled materials into new products and items, the materials must first be cleaned of oils and greases, soils, etc. Many products are similar to disposed diapers in that they contain cellulose materials and noncellulose materials (such as plastic, metal parts, etc.). I have found that items such as peanut cans, frozen juice cans, corrugated boxes and the like can be recycled. With peanut cans and frozen juice cans, the metal rims and plastic lids are retained and washed in the first washing machines, while the cellulose or paper making up the stiff paper walls of the cans is washed in the second washing machine as described above with respect to diapers. With corrugated boxes, the metal and plastic (for example, metal staples and plastic shipping labels) are separated from the cellulose making up the walls of the boxes in the first washing machine. The cellulose passes out of the first washing machine to be washed in the second washing machine. Cereal boxes (rectangular and cylindrical such as Quaker Oats containers) can be recycled into cellulose (the box walls) and plastic (the inner liner). Milk and juice cartons can be recycled into cellulose and plastic materials. Disposable food containers such as cups and utensils can be recycled into plastic and cellulose materials. A vapor barrier bag can be recycled into cellulose and plastic materials. By rotating the basket and blowing in air to agitate the goods, the cellulose making up the walls of these containers breaks down sufficiently to pass through the first basket mesh, thereby enabling separation of the cellulose from the non-cellulose materials.

Other items that can be processed are plastic items such as plastic wrappers (e.g. candy wrappers, cigarette wrappers). Also, plastic containers can be washed and recycled. One particularly difficult type of plasi container to recycle is a motor oil container. Even though the containers are made of recyclable plastic, recycling is discouraged because of the difficulty of cleaning the oil off of the plastic.

One method of processing plastic oil containers is to grind or chip the containers into small pieces. These pieces, which may be the same size as the tires discussed below, are then washed in a washing machine 13. The pieces are washed in 180 degrees Fahrenheit water, sand, a neutral surfactant and alkali. Washing removes the oil from the pieces. In addition, the sand cleans any paint, labels, and other non-plastic materials off of the plastic pieces.

I have also found that the method and system of the present invention also recycles soiled wood pulp products such as newsprint and waste paper. Newsprint is from newspapers. Waste paper includes disposed office products such as writing paper, typing paper, copier paper, and paper from computer printers. The present invention cleans ink off of newsprint and waste paper. Newsprint is similar to the cellulose found in diapers and as such can be cleaned with the same system and methods for cleaning cellulose. Newsprint and cellulose are both made from wood pulp.

To recycle waste paper such as newspapers, a load of newspapers is put into the second washing machine 15, 105. The same washing process as described above with washing the cellulose in the second washing machine is utilized to wash the newspaper. However, slightly hotter (160–185 degrees Fahrenheit) water is used in order to assist in breaking up the inks on the newsprint, and the pH can be between 10–13, such as 10.5. The washing process removes the ink from the paper and dumps it into the drain system 111. The wire mesh 48 in the second washing machine retaius the paper inside of the basket, while allowing the ink and water to pass therethrough. The cleaned newspaper is removed from the second washing machine 15, 105 and is loaded into the sling 81 and the extractor 83 to extract the moisture from the paper.

One problem with prior art methods of recycling newspaper is that the quality (and thus commercial value) of the final product is determined by the condition of the disposed newsprint making up the feedstock. Dirty, sun-baked newspaper is considered to have a lower commercial value than relatively clean (except for the ink) newspaper. My invention is able to clean and process dirty sun-baked newspaper to increase its commercial value. By washing the newspaper in a modified clothes washing machine, any dirt in the newspaper is washed away. Sun-baking typically turns newspaper yellow, due to the high acid content of newsprint. The high acid content is a by-product of the paper making process. Conversely to the paper maling process, my invention uses alkali to clean the newspaper, wherein the pH is raised to high levels. Using an alkaline wash liquor and either ozone or chlorine bleach (or both) the newspaper is whitened, thus raising its commercial appeal. The alkali rejuvenates the cellulose to reduce the brittleness of the cellulose fibers. Also, because the newspaper is washed in an alkaline wash liquor, it is no longer an acidic paper. As such, the recycled newspaper will not deteriorate as rapidly as acidic paper.

Some pigments are difficult to remove using the alkaline washing described above. Therefore, an optional subsequent bleaching step can be utilized. The paper can be further bleached by washing it in subsequent modules of the washing machine in water (180 degrees F.) and hydrogen sulfide. The pH of the wash liquor is about 4–5. An intermediate rinsing step can be used to assist in lowering the pH from an alkaline level to a natural level, wherein the pH can then be dropped below neutral by the addition of hydrogen sulfide.

If the newsprint is mixed with non-paper contaminants such as metal, then the bleaching can be carried out in a second washing machine. For example, the newsprint is loaded into a first washing machine, wherein the newsprint is pulped and then separated from the contaminants. The contaminants remain in the first washing machine, where they are removed from the last module. The newsprint exits the baskets in the last modules of the first washing machine. The newsprint is then transferred to a second washing machine for bleaching. By separating the contaminants, the occurrence of rust from the contaminants during the bleaching step is minimnized.

In addition, rf (radio frequency) energy can be directed at the wash liquor or water to enhance the deinking process. Conventional rf generators 341 are located at the bottom at each module (for example, in the drain trough). (For illustrative purposes, FIG. 14 only shows a few modules being equipped with rf generators). Rf generators can also be located adjacent to the pumps to treat the water before the water introduced into the washing machine. The treated water is used to wash the paper, whether it be newsprint, office paper, or some other paper which is to be deinked.

Still another aspect of the present invention uses enzymes to deink the paper (whether it be newsprint, office paper etc.). The paper is washed in a washing machine as described, however, the pH of wash liquor is about 7.0, and the temperature is about 140 degrees F., in order to allow the enzymes to be effective. The enzymes which are used to deink the paper are of either the cellulosic type or the amine type.

In addition to recycling materials with cellulose, I have found that the present invention also recycles materials without any cellulose. For example, the present invention recycles rubber vehicle tires that have been disposed of. Prior art methods of handling disposed tires involve either storing the tires in landfills or shredding the tires for burning in an incinerator. Storing the tires in landfills takes land out of production. The insides of the tires also hold water and are therefore a fertile breeding ground for insects such as mosquitoes. Burning tires is wastefll and produces air pollution. Before the tires can be recycled they must be cleaned. The used tires are soiled with grease, road oil and dirt. The polyester belting and the tread are two locations in particular where greases, oils and dirt accumulate and are difficult to remove.

To recycle tires with the present invention, the tires are shredded to produce small rubber pellets or pieces. Conventional and commercially available shredders are used. In the preferred embodiment, the pellets range in size from 0.1–1.0 inches. Many tires contain steel and other types of belts. The entire tire, including the belts, is shredded.

The tire pellets are loaded directly into the second washing machine 15. The pellets are washed in water, soap (or other surfactant) and alkali. The same washing process as described with respect to the cellulose in the second washing machine is used. The baskets and the air agitates the pellets, wherein the pellets are cleaned of dirt, grease and oil. The ozone injected into the washing machine 15 along with the blower air serves to sterilize the tire pieces.

After the tire pieces are washed, they are removed from the washer and are dried. Drying is performed by placing the tire pieces in a dryer. The dryer is modified by lining the inside of its basket with 316 mesh to retain the tire pieces inside of the basket. After drying, the cleaned rubber can be mixed with new rubber to be made into new rubber products. For instance, the cleaned rubber can be vulcanized or melted.

Additionally, the present invention can wash other non-cellulose materials such as glass containers for recycling. The glass containers, such as bottles and the like, are loaded into the first basket of the second washing machine. Hot water (160 degrees) and a neutral surfactant, such as a mild soap, are added to the first basket. Because glass is impenetrable by water, strong surfactants are not believed to be needed. The first basket is rotated and air is blown into the first basket by the blower, so as to agitate the glass containers. During agitation, it is likely that breakage of some and possibly all of the glass containers will occur. The 316 mesh lining the interior of the first basket will retain all but the tiniest pieces of glass inside of the first basket. During agitation, any labels that were on the glass containers are separated from the glass. Cellulose or paper labels will exit the first basket through the mesh. Ozone can be injected into the chamber to sterilize the glass.

If additional cleaning of the glass is required, then additional washing cycles in subsequent mesh lined baskets can occur. When the glass is cleaned, it is removed from the washing machine. The cleaned glass is dried, either in a sling, a tumbling drier, or by passing the glass through hot air.

To complete the recycling process, the cleaned glass is melted and formed into new containers or other items. This melting and forming is done in accordance with conventional techniques.

Figure 9:
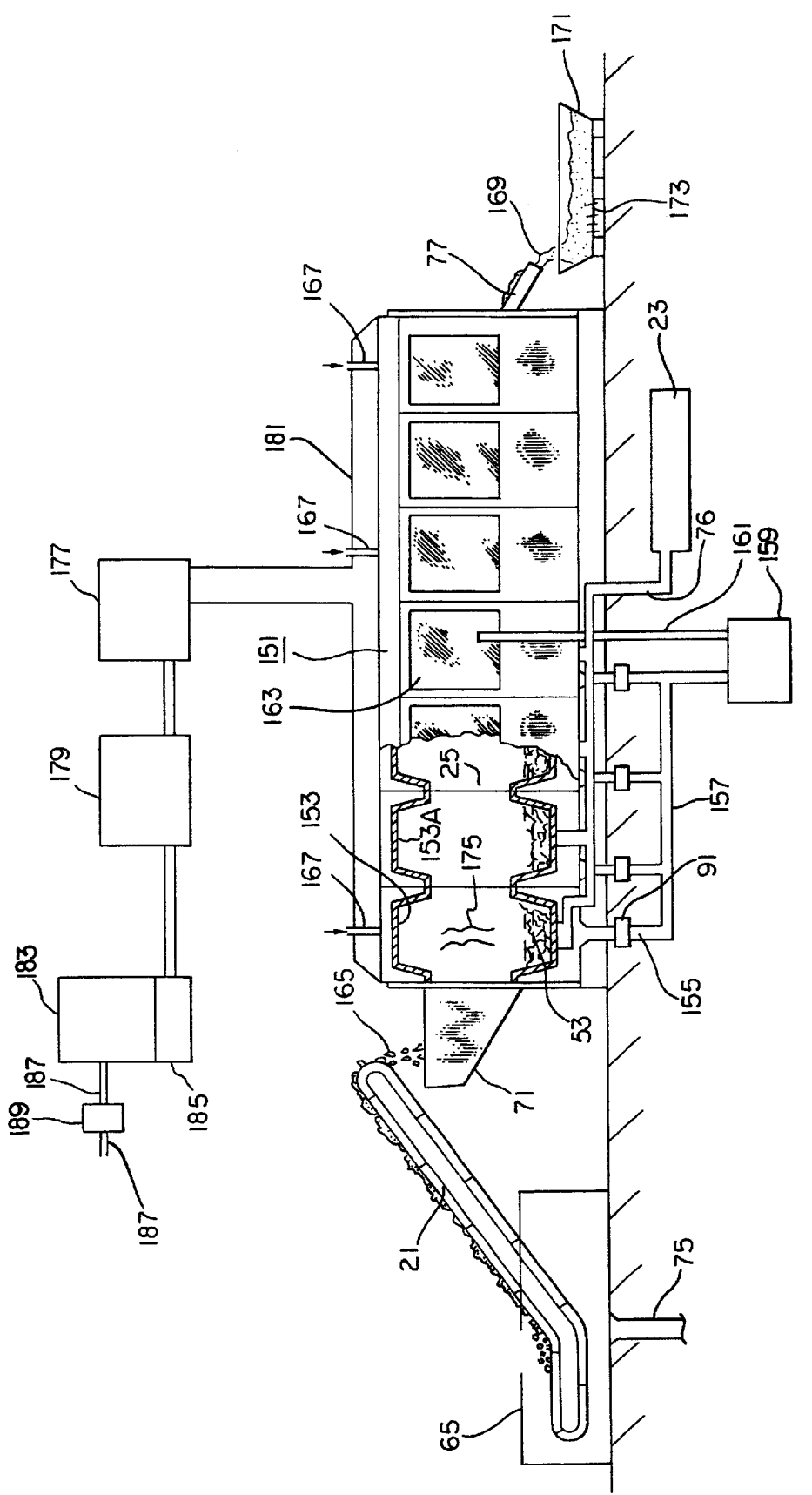
FIG. 9 is a schematic side view of the system showing the washing machine configured for composting and processing waste material such as food and yard waste.

The present invention also provides composting organic matter such as food and yard waste (see FIG. 9).

To compost this waste, the material is loaded into the first basket 153 of a washing machine 151. The washing machine, which is typically made for washing clothes and textiles, is modified. The first basket 153 is lined with 316 mesh as in the second washing machine 15 of FIG. 1. Subsequent baskets in the composting machine 151 are lined with finer meshes (having smaller perforations that the first basket mesh perforations). Thus, the perforations of the mesh in the second basket 153A of the composting machine are smaller than the perforations of the first basket mesh perforations; the perforations of the mesh in the third basket of the composting machine are smaller than the perforations of the second basket mesh perforations; and so on with the mesh perforations gradually decreasing in size from the first basket to the last basket.

The drains 155 of the composting machine are configured to provide circulation back into the washing machine, rather than dumping the fluids to the sewer system. The first four modules or chambers have their drains 155 connected to a common pipe 157. A solids pump 159 is connected in line with the pipe 157 such that the input of the pump is connected to the pipe 157. The outlet of the pump is connected to a pipe 161 that opens into the interior of the fourth chamber 163. The outlet of the pipe 161 can be configured to discharge to the interior of the basket of the fourth chamber 163. Thus, the fluids collected by the drains of the first four chambers are circulated back into the fourth basket. A similar loop, with piping and pumps, is used on the remaining chambers, which are the fifth to the last chambers of the machine. This other loop circulates fluids from the last chambers back into the last basket.

A blower 23 is provided as in the second washing machine of FIG. 1, but there is no ozone generator. The blower blows air into all of the chambers. (In FIG. 9, the blower connections have been shown only for the first few chambers for simplicity.)

To compost the waste material, the waste material 165 is loaded into the first basket 153 of the composting machine 151. Warm water 167 (98–120 degrees Fahrenheit) and a small amount of alkali are also loaded into the first basket or chamber. The amount of water used is sufficient to create a congealed mass of waste. Too much water produces a thin slurry. For a Model 76032 Milnor continuous batch washing machine, the level of water should be about three inches from the lowermost portion of the basket, for a 110 pound load of waste material. The amount of alkali required raises the ph of the mixture in the first basket to about 8.0–8.5. This promotes the growth of bacteria. In addition, a food supply may be added to quicken biological growth. One type of food supply that can be used is dry or meal type dog food. Then, the first basket is rotated as described above. Additionally, the blower 23 injects air into the first basket. Thus, the waste material is agitated by the movement of the basket and by the blown in air, which initiates biological activity.

After being agitated for a predetermined amount of time, such as 20 minutes, the machine 151 automatically stops rotating the first basket (and the other baskets as all of the baskets in the machine rotate in unison) and opens the drain 155 (and the drains of all of the other chambers). The liquid from the basket passes through the first basket mesh and into the drain. The drain is then closed and the liquid is pumped into the fourth basket by the pump 159. The machine then automatically transfers the contents of the first basket 153 into the second basket 153A (and the contents of each basket into the next basket). The agitation cycle is again started, wherein the baskets are rotated and air is injected into the baskets. Thus, the waste material is processed as it travels through the composting machine. When the material 169 exits the machine from the last basket, it is placed in a bin 171 where excess water can drain out through perforations 173 in the bottom of the bin.

The processed material 169 can be used as composted material normally would be used. For example, the processed material can be mixed with soil in gardens.

While processing the waste material in the washing machine, methane gas 175 will be generated. This gas is vacuumed out of the chambers by a suction pump 177 and sent to a storage tank 179. The tops of the chamber 25 in the washing machine are sealed by a hood 181, which prevents the methane gas from escaping.

Once stored in the tank 179, the methane can be sold or used as a fuel source to heat water added to the washing machine through inputs 167. To use the methane to heat water, the methane is conveyed from the storage tank 179 to a burner 185 in a hot water heater 183. At the burner 185, the methane is combusted to produce heat. The heated water is then conveyed back to water inlets 167 through a pipe 187. A valve 189 contains the flow of water.

Although the method of composting waste material has been described using an aWlkine mixture, the waste material can be composed using an acidic mixture. An acid, such as acetic acid, carbonic acid or oxalic acid is added to the waste material in the washing machine. Sufficient acid is added to lower the ph to 2.3 to 4.0.

Figure 10:
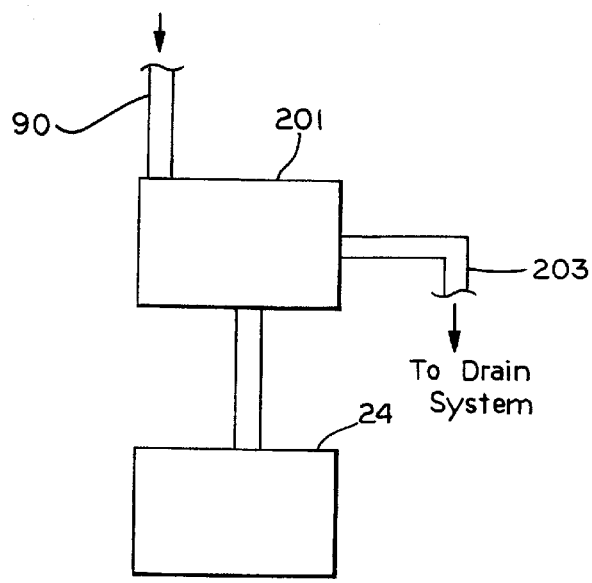
FIG. 10 is a block diagram showing an apparatus for treating waste water.

During any one of the above described recycling processes, the waste water drained from the washing machine may become contaminated with heavy metals. To reduce the heavy metal content of the waste water, the waste water is exposed to ozone in treatment unit 201 (see FIG. 10). The waste water is conveyed to the treatment unit 201 by the drain pipe 90 (or 111). The treatment unit receives ozone from an ozone supply 24. The ozone bubbles up through the waste water, causing a reduction in the heavy metals. The waste water exits the treatment unit 201 by a pipe 203, where it is then conveyed into the drain system. From there the waste water can be treated at a sewage treatment facility. The treatment unit is periodically cleaned to remove the accumulated contaminants.

One of the chambers of the first and second washing machines 13, 15 of FIG. 1 may be modified to remove insoluble contaminants that are not affected by processing operations in the preceding chambers. This modified chamber may be the last chamber, which is adjacent to the outlet 33. The chamber is modified by providing nested baskets. The other portions of the chamber are as described above. Referring to FIG. 11, the basket arrangement in the modified chamber has an inner basket 211 and an outer basket 213. The inner basket 211 is nested inside of the outer basket 213. The inner basket is coupled to the outer basket so that both rotate in unison. A gap 215 separates the inner basket and the outer basket. Each basket is provided with ribs 217 on its inner circumference. The gap may be several inches wide between the baskets and in any case is wider than the ribs 217 on the outer basket so as to allow any goods located in the gap to pass freely over the ribs. The size of the last chamber may be enlarged by 50% over the size of the preceding chambers in order that the inner basket 211 can accommodate a full load of goods.

Both baskets are provided with wire mesh, which mesh provides the desired perforation size. The perforations of the inner basket mesh are larger than the perforations of the outer basket mesh. For example, when processing cellulose through the washing machine, the inner basket mesh has 30 wires per inch, while the outer basket mesh has 40 to 60 wires per inch.

During operation, the goods that are being processed enter the inner basket 211 by the opening 35 from the preceding chamber. The baskets are rotated as described above so as to agitate the goods. In addition, air can be blown in. The goods, such as cellulose, pass through the mesh of the inner basket 211 and are retained in the gap 215 by the outer basket 213. This is because the goods are unable to pass through the mesh of the outer basket. The contaminants, which include husks, hair, undigested foods, etc., are retained by the inner basket.

The inner basket is provided with a non-perforated portion 219 which serves as the scoop for the outer basket. This portion 219 is located above the nbs, using the orientation of FIG. 11. Also above the ribs, opposite the scoop 219 is a non-perforated portion 221 which prevents goods located in the gap 215 from returning to the inner basket. The inner basket also has a perforated scoop 223. When it is time to transfer the goods out of the chamber, the baskets rotate a more complete revolution than is achieved during agitation operations. This moves the cellulose that is located inside the gap 215 to the scoop 219, wherein the cellulose is prevented from reentering the inner basket and is transferred out of the chamber. The cellulose exits by way of a ramp 77 (see FIG. 1) where it is deposited in a bin. The contaminants in the inner basket are moved onto the scoop 223 by the rotation, wherein the contaminants exit by way of a separate ramp where they are routed to a separate bin.

Figure 12:
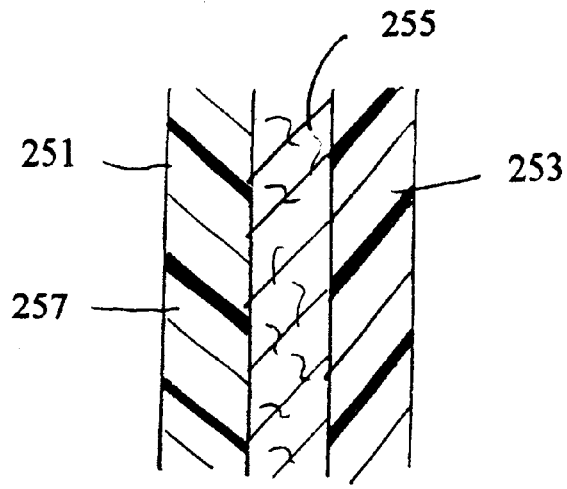
FIG. 12 is a cross-sectional view of a portion of a wall of a milk carton.

As discussed above, laminated paper goods such as milk cartons and drink boxes juice cartons), can be processed with the subject invention. These packages utilize sheets of materials that include multiple layers of plastic and paper. The materials are used to make up the walls of the packages. The packages are typically made from a single sheet cut out in a pattern and folded to make the appropriate shaped package. For example, referring to FIG. 12, a milk carton 251 has a first layer 253 of plastic, a second or intermediate layer 255 of paper and a third layer of plastic 257. One of the plastic layers is exposed to the milk or other liquid inside of the container, while the other plastic layer is exposed to the exterior environment surrounding the milk carton. It is believed that the plastic layers are made up of polyvinyl or polyester.

The paper 225 is of a high wet strength type because the edges of the material (and thus the paper layer) are exposed to the liquid contained therein. The high wet strength is typically imparted to the paper by a resin that is applied to the paper fibers during manufacture. High wet strength paper retains its structure when wet. Low wet strength paper pulls apart easily when wet. Low wet strength paper is easier to pulp than is high wet strength paper.

The layers of the milk carton 251 are bonded together in some fashion. It is believed that the bonding occurs due either to the materials themselves (for example, the plastic) or due to an adhesive.

Figure 13:
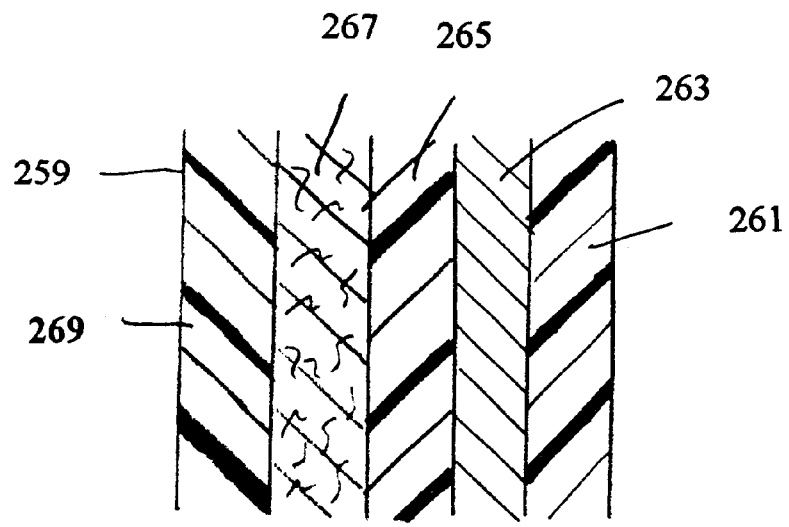
FIG. 13 is a cross-sectional view of a portion of a wall of a drink box or aqon.

Referring to FIG. 13, another type of packaging that uses multiple layer materials are drink boxes 259. A sheet of material used in a drink box 259 has five layers; namely a first layer 261 that is plastic, a second layer 263 that is aluminum, a third layer 265 that is plastic, a fourth layer 267 that is paper, and fifth layer 269 that is plastic. The fifth layer 269 is typically exposed to the contents of the package, while the first layer 261 is exposed to the exterior of the package. The paper 267 is of a low wet strength type.

Still another type of packaging utilizes sheets of materials that are similar to the drink box material of FIG. 13 above, with exception that the paper layer 267 utilizes high wet strength paper. Such packaging is referred to as regular milk cartons containing aluminum and is typically utilized in circumstances where refrigeration is not used.

Figure 14:
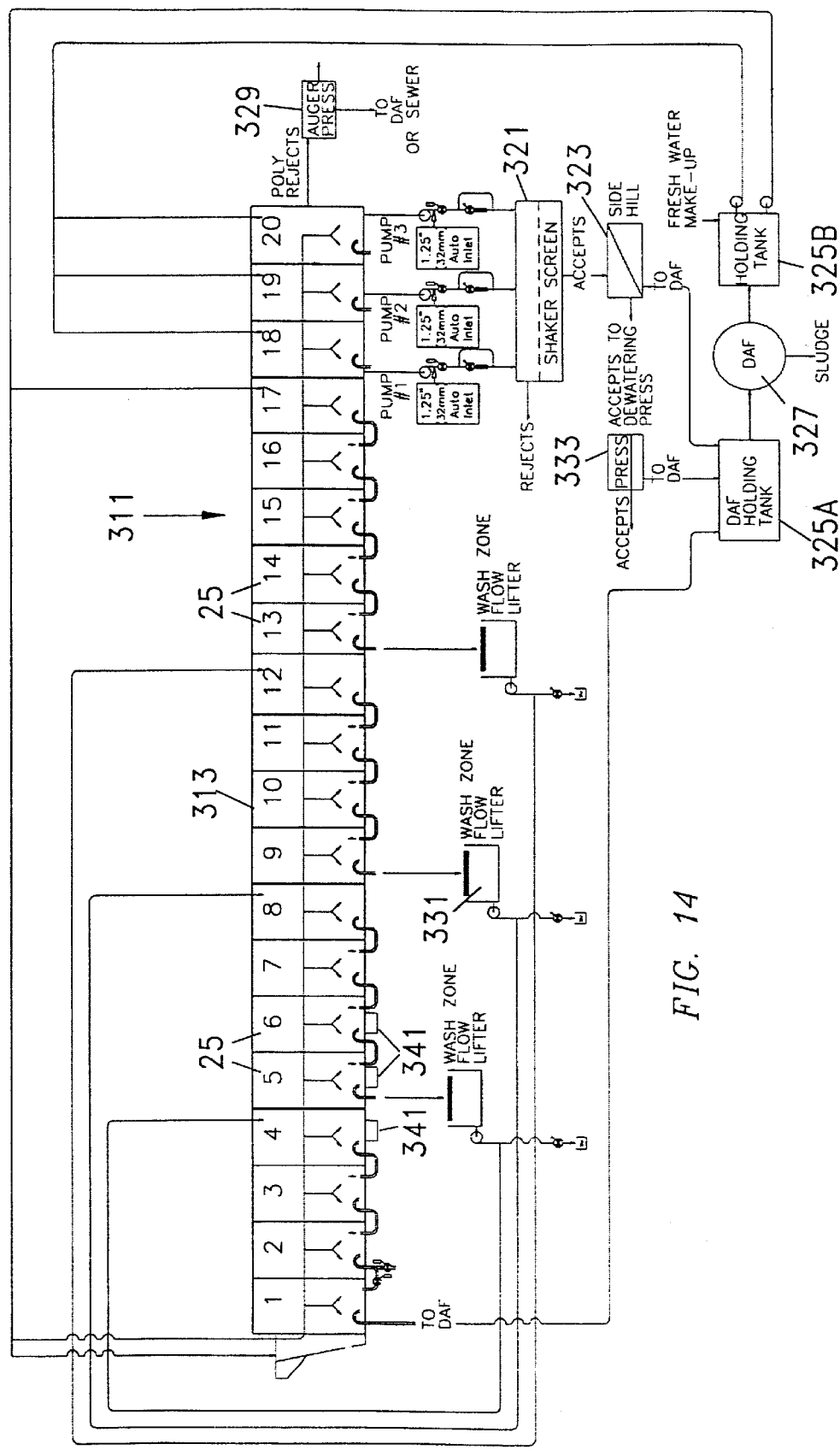
FIG. 14 is a schematic view of the system of the present invention, in accordwith another embodiment.

Referring to FIG. 14, the system 311 for processing packaging that utilizes multiple layered materials (such as milk cartons and drink boxes) will now be described. The system uses a continuous batch or tunnel washing machine 313 as discussed above with respect to FIGS. 1–4. The washing machine is more fillly described in U.S. Pat. No. 4,236,393, the specification, including drawings, of which is incorporated herein by reference. The washing machine has plural chambers 25 or modules therein. Inside of each module 25 is a rotatable perforated basket 37. Each basket utilizes an internal perforated scoop to dewater the goods during transfer from one module to the next (referred to in the industry as top transfer). The washing machine contains a plural number of modules. The actual number of modules can vary according to the specific application.

The system 311 also includes other equipment, which are a shaker screen 321, a side hill 323, one or more holding tanks 325A, 325B, a Dissolved Air Floatation (DAF) device 327, a press 329 and several filters 331.

The method of processing milk cartons and drink boxes will now be described, referring to FIG. 14. The goods are loaded into the first module of the washing machine 313. The goods are then processed by each module in turn before being moved to the next module. The processing of the goods contain several steps or phases. In general, these steps are washing the goods to remove contaminants, wetting the goods, pulping the paper component contained in the goods, cleaning the paper and plastic components, rising and conditioning the paper (pulp) and plastic components, and separation of the paper component from the plastic component. Although the washing machine has discrete modules, the various steps can be performed in each module. For example, after contaminants have been removed from the goods, the goods can be wetted, cleaned, and the paper component pulped, all in the same module or series of modules.

The processing of the goods will now be described more specifically. The goods are loaded into the first module, along with hot water (for example, 200 degrees F.) and sufficient caustic to raise to pH of the wash liquor (which is made up of water and chemicals) to between 10–13. In the preferred embodiment, a pH of 12.0 is used. Alkaline materials other than caustic can be utilized, such as metasilicate, orthosilicate, soda ash or pot ash, or sodium peroxide. In addition, a neutral or non-ionic surfactant is added to the wash liquor.

After the goods have been loaded into the first module, and thus inside the first basket, the basket (along with the other baskets in the washing machine) is rotated to agitate the goods in the wash liquor. The goods are cleaned of waste such as Biological Oxygen Demand (BOD) matter, Chemical Oxygen Demand (COD) matter, dirt, and other contaminants. Such BOD matter includes milk and juice that remains in the packaging. Mlk and juice are subject to biological action, due in part to the lack of refrigeration of the disposed packaging (which disposed packaging is referred to as post-consumer waste). In addition, such waste can include inks on the packaging. In addition to be cleaned of contaminates, the goods are wetted for subsequent processing.

After the washing step in the first module has been completed, the wash liquor is drained out of the first module. The wash liquor is either dumped to a sewer or processed to clarify the water. For example, the wash liquor can flow into the Dissolved Air Floatation (DAF) device 327, which is conventional and commercially available. Subsequent modules may be used to further wash the goods and clean them of waste.

In addition to removing waste from the goods, the first module and subsequent modules are used to provide for penetration of the wash liquor into the paper layer of the goods. By obtaining penetration of the paper with the wash liquor, the wet strength resins can be removed from the paper and the paper can be more easily separated from the plastic (and metal) layers. The wet strength resins are removed from the paper by the washing process. The wet strength resins are removed from the washing machine along with the waste.

The goods continue to traverse through the washing machine wherein the separation of the paper and plastic components occurs. Some separation occurs during the initial wetting step of processing. In the separation stage, the goods are washed in hot water (200 degrees F.) and sufficient caustic to provide the wash liquor with a pH of between 10–13. In addition, hydrogen peroxide is added to the wash liquor. The hydrogen peroxide assists in breaking down the wet strength of the paper. Alternatives to hydrogen peroxide can be used, such as oxone, persulfite, preacetic acid, hypochloride, oxalic, ozone, and other oxidizing agents.

The wet strength resins are removed from the paper by the washing process. In addition, the washing process pulps the paper and cleans both the paper and plastic components. The wash liquor for pulping and cleaning has the same make up as the wash liquor for separating.

The length of time for satisfactory penetration of the paper by the wash liquor can be decreased by various mechanisms or techniques. One such mechanism or technique is using low water levels in the first modules. For example, for a load of goods weighing 50–120 pounds, about 23–35 gallons of wash liquor is used (for a 76 inch diameter basket). This immerses the goods in about 2–4 inches of wash liquor. Typically (for example, in the later steps of processing), the goods are immersed in a wash liquor of level of 8 to 13 inches. By providing a smaller amount of wash liquor, floatation of the goods is avoided and more surface-to-surface friction between the individual packages is generated, with the result being faster separation of the plastic layers from the paper layer. One advantage to this technique is that the plastic is removed from the paper in large pieces, because the plastic layers tend to peel off of the paper layer. Maintaining the plastic in relatively large pieces simplifies separation of the pulped paper from the plastic in later modules of the washing machine. Also, the provision of a small amount of wash liquor increases the fiber-to-fiber mechanical action and aids in the pulping of the paper.

If the wash liquor level is lowered, it is preferable to perform this step after the goods have been washed of waste material. This is because such washing takes less time if conducted in higher wash liquor levels. For example, if the goods are washed in the first module, then the wetting step can occur in the next several modules.

Figure 15:
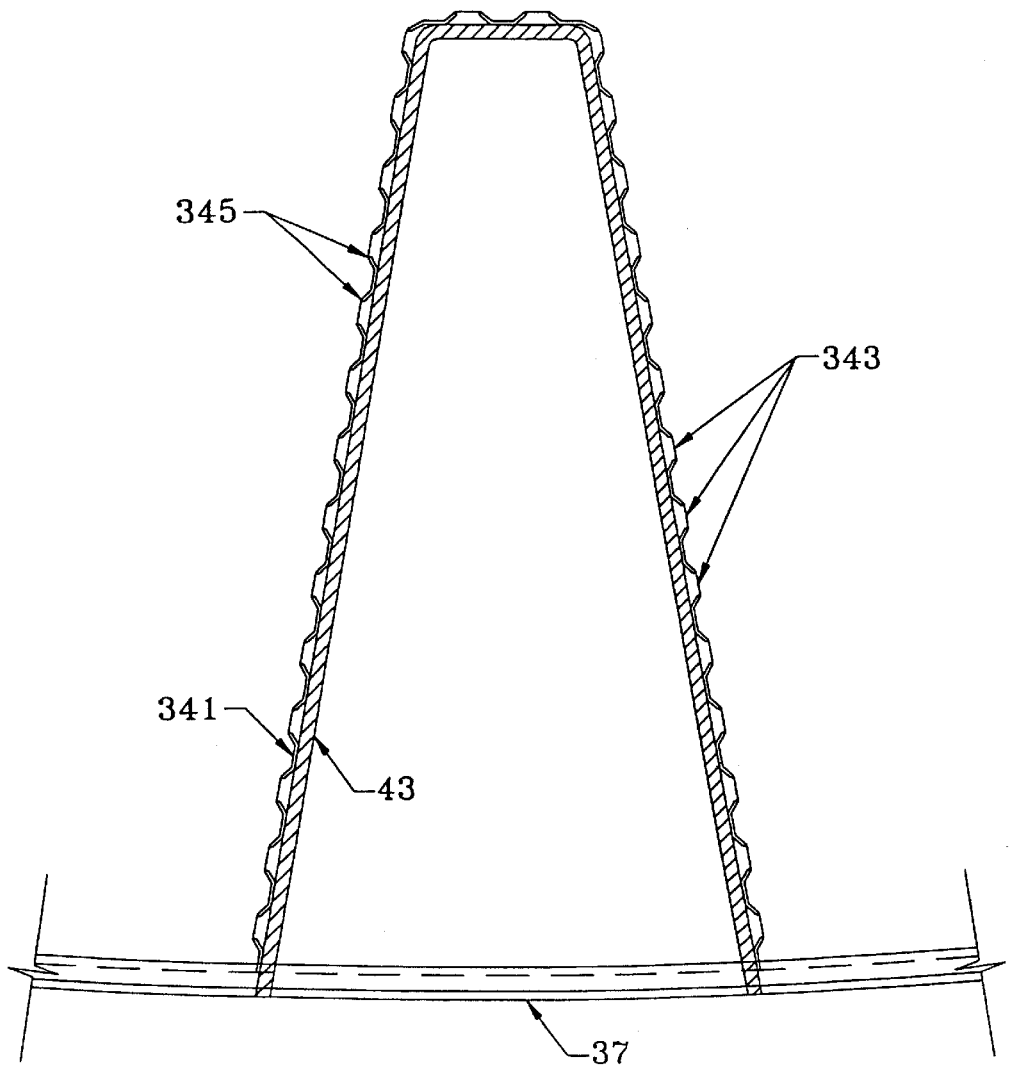
FIG. 15 is a transverse cross-sectional view of an abrasive device, in accordance with a preferred embodiment.

Another mechanism or technique that can be used to shorten the amount of time to separate the paper from the plastic is the use of abrasive devices located inside of the basket. One type of abrasive device uses inverted perforated plates (See FIG. 15). Metal plates 341 are perforated 343 using a force with an impact component. The impact causes the edges 345 of the plate around the perforations 343 to deflect outward, much like a food grater. These deflected edges 345 provide a roughness. The plates 341 are attached to the ribs 43 so that the deflected edges can contact the goods 251, 259 inside of the basket 37. As the basket rotates, the goods contact the roughened plates, wherein openings are formed in the outer plastic layer 253 of the goods. This allows faster penetration of the wash liquor into the paper layer 255 without causing the formation of small pieces of plastic.

Figure 16:
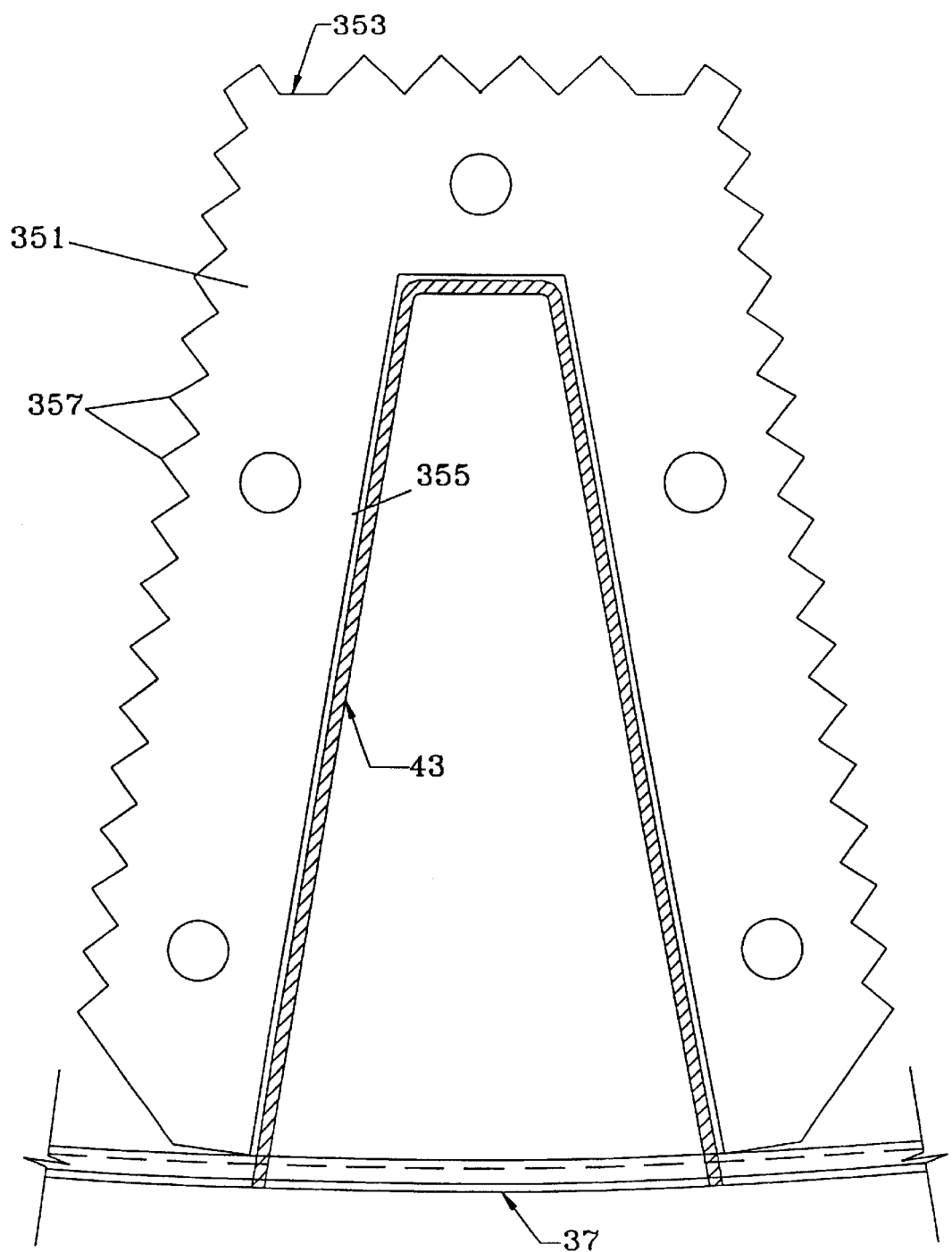
FIG. 16 is a transverse cross-sectional view of an abrasive device, in accordance with another embodiment.

Another type of abrasive device uses blades 351 inside of the basket (See FIG. 16). Each blade 351 has a cutting edge 353 and a coupling edge 355. The blades 351 have an inverted "U" shape and are coupled over the ribs. The coupling edge 355 of each blade is coupled to the respective rib so that the blade protrudes outwardly from the ribs. The blades are distributed along the length of each rib; the separation between each blade can be several inches. The cutting edge 353 of each blade has saw teeth 357. As the basket rotates, the goods 251, 259 contact the cutting edges of the blades, which cut openings in the plastic layers 257, 267. This too allows penetration of the wash liquor into the paper layer, 255. The blades 351 can be used separately or in combination with the inverted perforated plates 341.

Figure 17:
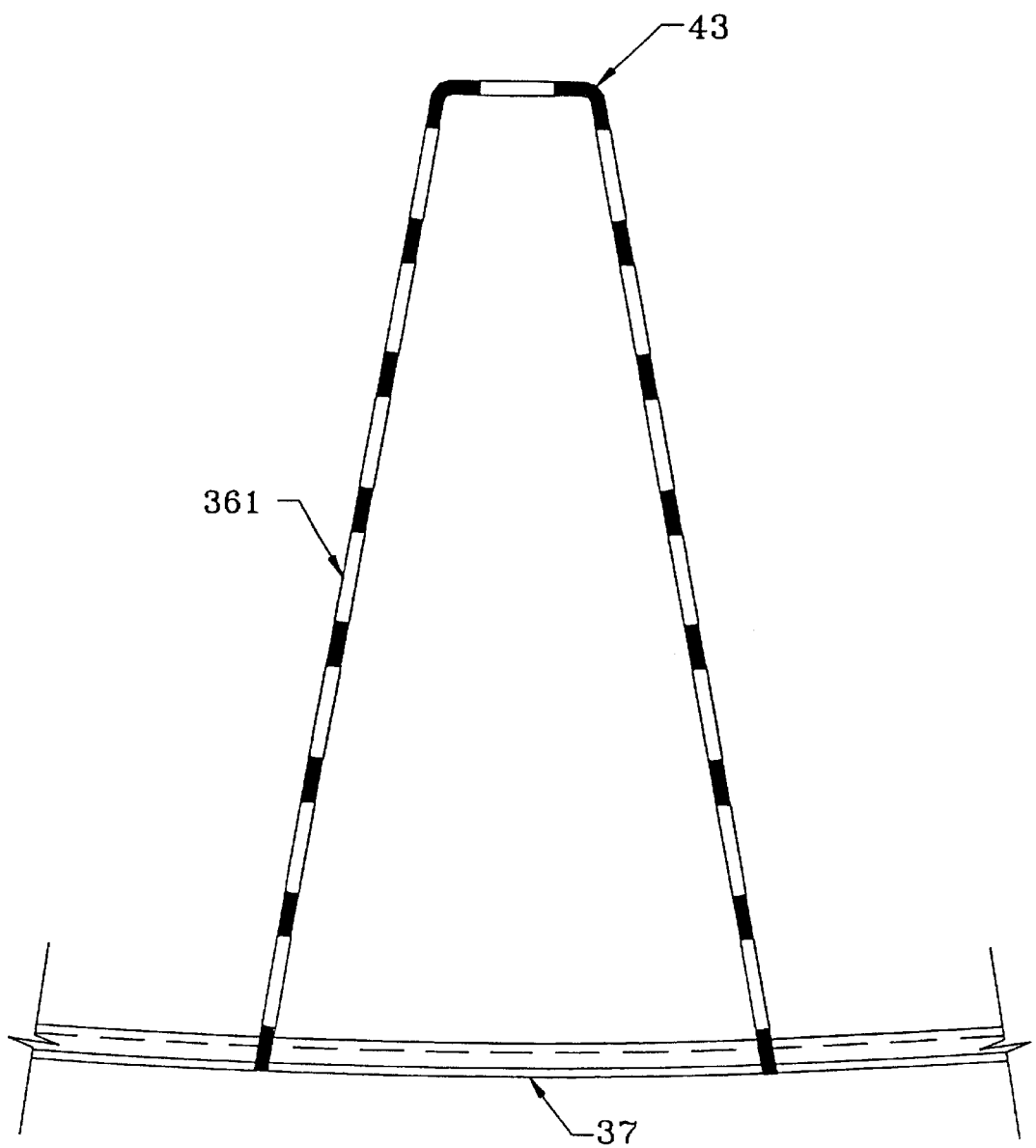
FIG. 17 is a transverse cross-sectional view of a modified rib device, in accordance with yet another embodiment.
Figure 18:
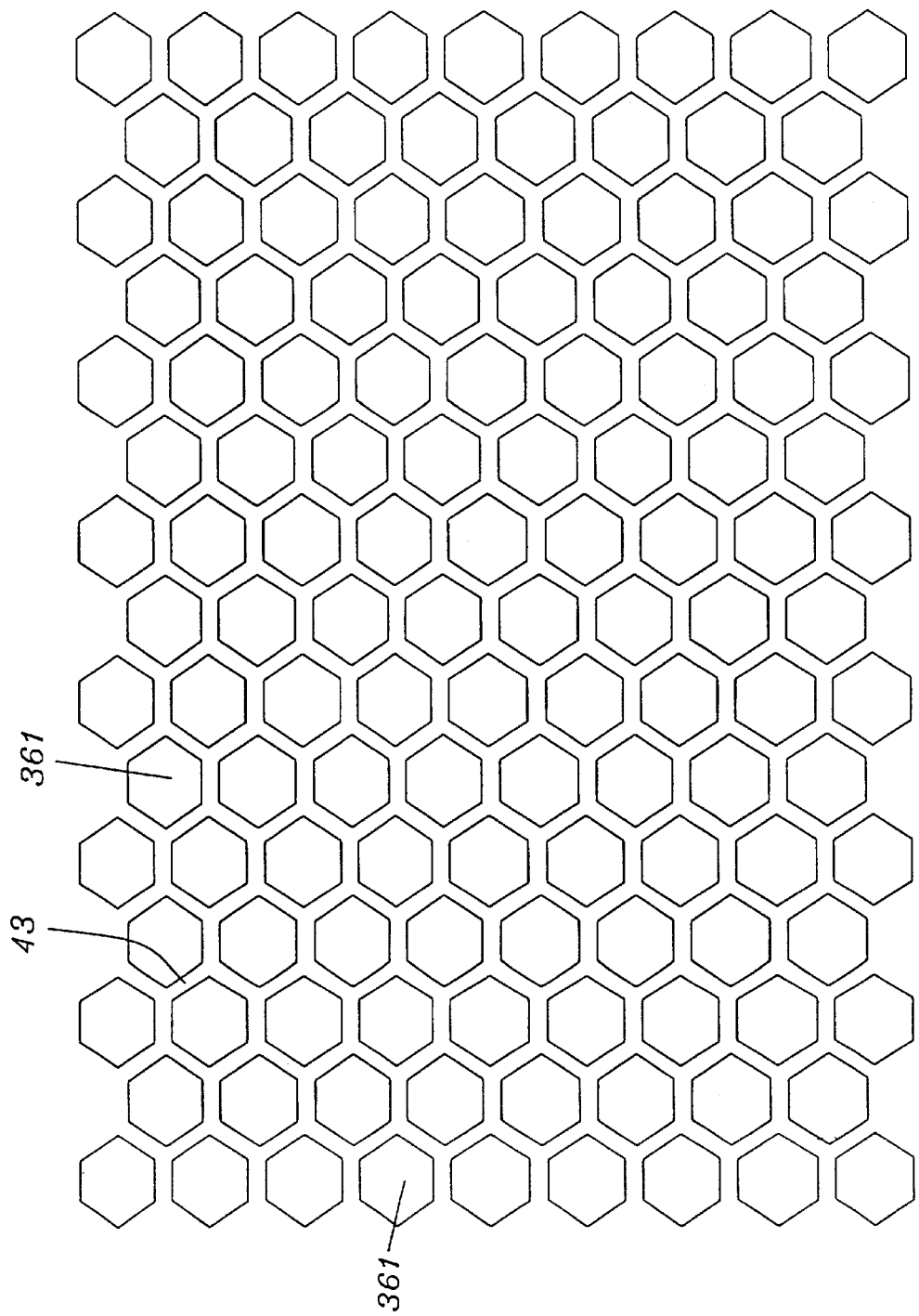
FIG. 18 is a view of one of the faces of the modified rib of FIG. 17 showing the openings therein.

Still another mechanism that can be used to shorten the amount of time to separate the paper from the plastic is the use of large perforations 361 in the ribs 43 (See FIGS. 17 & 18). The ribs are hollow inside. Each rib has large openings 361 (between ½ to 1½ inches in diameter) therethrough. As the basket and ribs rotate, the wash liquor flows through the openings 361 in the ribs. The goods are forced against the leading faces of the ribs. However, the openings 361 are too small to allow the goods to pass through. It is believed that a pressure differential across the goods is produced as the goods lay across the face of a rib. This pressure differential assists in separating the paper from the plastic. When the paper does become separated from the plastic, the paper flows through the openings 361 in the ribs. This further assists in pulping the paper. The plastic layers peel off in large segments from the paper layer, thus simplifying plastic and paper separation in subsequent steps. During basket rotation, the plastic rides along the leading face of the respective rib, until it drops over the inside end of the rib.

The surface area of the ribs 43 can be increased in order to provide for more abrasive devices. For example, the height (the distance the ribs extend from the basket wall into the interior of the basket) of the ribs can be increased from conventional ribs to provide for more surface area. For example, a conventional rib may have a height of 3 inches, while a rib utilized by the present invention can have a height of 10 inches (for a 76 inch diameter basket). The increase in rib surface area allows for more inverted perforations 343 (FIG. 15), saw blade teeth 357 (FIG. 16), or rib openings 361 (FIG. 17). In addition, a rib with a greater height lifts the goods higher in the module. For example, a short rib may lift most of the goods only 30–45 degrees from the bottommost position in the module. A higher rib may lift the goods 90 degrees or more. Thus, when the goods are dropped from the higher ribs, they are dropped from a higher position and land with more force in the wash liquor. This further increases mechanical agitation.

The modified ribs can be present in every module of the washing machine. As a practical matter, however, the modified ribs need not be in the last few modules where the pulp exits the washing machine.

After the paper has been pulped, the pulp and plastic components are rinsed and conditioned. The pulp and plastic are rinsed in water and a weak acid (such as phosphoric acid, acetic acid, or laundry sour) to bring the pH of the components down to 6.5–7.0. In addition, the rinsing mechanical action causes more fiber-to-fiber action which assists in more complete pulping of the paper components. More complete pulping reduces the occurrence of fiber flocks which are described below.

In the last modules of the washing machine, the paper component of the goods, which has been pulped, exits the washing machine through the drains in the bottom of each modules. The pulp and plastic are washed in fresh water at this separation stage of processing. As described above with respect to FIGS. 2 and 4, the basket has perforations or slots that are small enough to retain the plastic, but allow the pulp to pass therethrough. The basket can be supplemented with a screen to obtain the desired perforation or slot size. The screen can be extraction plates which are slotted circumferentially around the basket diameter.

The pulp can exit the last washing machine modules in several ways. One way is through the drain in the bottom of each module. The drain is opened quickly to obtain high velocity flow through the drain. Another way is to install a pipe or tube in the module, with the lower end of the pipe located near the bottom of the module. The pulp is pumped out of the module through the pipe. Still another way is to allow the pulp fibers to float over the top of a weir. The weir is located between the basket and the chamber walls of the module.

The pulp slurry flows to the shaker screen 321, which is a conventional and commercially available piece of equipment. The shaker screen removes debris that passed through the basket 37. The shaker screen 321 has a moving or vibrating screen that has perforations and/or slots, which are sized to pass the pulp. For example, the perforations or slots can be 0.064 inches in size. The pulp slurry from the washing machine is directed against the moving screen. The perforations of the moving screen are selected so as to pass pulp and reject undesirable clumps of material such as pulp clumps (clumps of pulp are referred to as flocks). The pulp and other material that fails to pass through the shaker screen is referred to as "rejects". The rejects are removed from the shaker screen and are either disposed of or reintroduced into the washing machine for further processing. The rejects are reintroduced into the first module of the washing machine at a time that occurs after the drain in the first module has opened, but before the goods in the first module are transferred to the second module. If the rejects are primarily clumps of pulp, then further processing will assist in breaking up these clumps.

The pulp that passes through the shaker screen is referred to as "accepts". The accepts, which are in the form of a pulp slurry, go to the side hill 323, which is also conventional and commercially available. Alternatively, the accepts from the shaker screen could be routed to a second shaker screen having smaller perforations or slots (for example, 0.024 inches), after which the pulp slurry is routed to the side hill. The second shaker screen is used to flrther remove debris from the pulp. Alternatively, after the side hill, the pulp goes to a storage chest.

The side hill 323 is for thickening the pulp and reclaiming the water from the slurry. The side hill 323 has an inclined screen, so that the screen has a top portion and a bottom portion. The perforations in the screen are small so as to pass water, but block passage of the pulp therethrough. The pulp slurry from the shaker screen is introduced onto the top edge of the inclined screen. The pulp washes down the screen to the bottom edge of the screen, while the water passes through the screen. The pulp is then removed from the side hill.

The pulp can be put into a storage chest. The pulp can then be taken from the storage chest, or directly from the side hill and put into an extractor or press 333, where the moisture content is reduced. The pulp can be sold in a wet condition (referred to as wet lap, wherein the pulp contains as much as 40% water). Alternatively, the pulp can be air dried to reduce the moisture content to minimal levels. The pulp (whether wet lap or air dried) is then baled or otherwise packaged for shipment to a facility for reuse.

The liquid exiting the side hill flows into a holding tank 325A and thence into the DAF 327. The DAF 327 clarifies (by removing suspended solids) the liquid exiting the washing machine for reuse. The DAF has a tank, into which the liquid is introduced. Air is introduced into the liquid, which air causes debris and contaminants to float on the surface of the liquid. A scoop removes the floating matter. The cleaned water exits the DAF and goes to a holding tank 325B. The floating matter in the DAF is removed and disposed of. Ozone can be introduced into the DAF liquid to further clean the liquid.

The holding tank 325B is used to provide water for the modules of the washing machine. Fresh water can be added to the holding tank as make-up water.

The last module contains primarily plastic from the packaging (and metal if the goods are drink boxes). Other insolubles (such as straws, cellophane, etc.) may also be present if they are introduced into the washing machine along with the post consumer waste. These components exit the last module of the washing machine and are brought to the press 329. The press 329 removes much of the liquid from the plastic. The plastic is then bailed for reuse. The liquid extracted from the plastic by the press is routed to either DAF 327 for reuse or to the sewer.

Using the method described herein, the pulp has a brightness of 86%, which is higher than what can be obtained using conventional methods (72%). However, should the goods be especially dirty, or there be a need for cleaner pulp, then the pulp from the side hill can be routed to a second washing machine, wherein the pulp is cleaned with hot water, caustic, and a surfactant as described above.

The washing process includes four parameters, namely, time, temperature, mechanical action and chemicals. The amount of time required in each module depends on the number of modules available in the washing machine. For example, in a seven or eight module washing machine, the goods stay in each module about 15–30 minutes. This is referred to as a transfer rate, wherein the goods transfer from one module to the next module every 15–30 minutes. The first module is used to wash the goods and also to wet the paper layer. The next 34 modules are used to remove the wet strength chemicals from the paper layer and to break down the paper layer into pulp. The last 34 modules are used to remove the pulp from the washing machine while leaving the plastic and other insolubles in the baskets.

The time spent in each module can be reduced, and consequently the throughput of a washing machine can be increased, by increasing the number of modules. For example, a 16–30 module washing machine can be used, wherein the goods spend 3–10 minutes in each module. Thus, the output (typically measured in tons per day) of a 30 module washing machine (20 tons per day) greatly exceeds the output of a 7–8 module washing machine (less than 5 tons per day).

Another parameter of the washing process is temperature. As described above, the temperature of the wash liquor is initially very hot (200 degrees F.) in order to wash contaminants from the goods, and also to assist in breaking down the wet strength of the paper. After the pulp has been separated from the plastic, and the goods are rinsed, lower temperatures can be used (for example about 160 degrees F.).

Another parameter of the washing process is mechanical action. The mechanical action used in the washing process includes the rotation of the basket 37 (see FIGS. 2 and 3). The ribs in the basket lift the goods out of the wash liquor in the bottom of the basket and then allow the goods to tumble back down into the wash liquor. In addition, the direction of rotation of the basket is reversed after the basket has rotated about 240–290 degrees. This further increases the mechanical action. The mechanical action can be firer increased by providing the abrasive devices described above in the basket. Also, air can be blown into the basket from a location underneath the basket, to increase the mechanical action. Still another alternative to increase the mechanical action is to recirculate the wash liquor by removing some of the wash liquor and then reintroducing the removed wash liquor into the module from the top of the module. It is believed that recirculating the wash liquor in this manner assists in cleaning the basket perforations.

Another parameter of the washing process is chemicals. The chemicals in each stage of the process are described above.

Referring to FIG. 14, a specific example of processing milk cartons and drink boxes will be described. The washing machine 311 has twenty modules 25. The first module is used to wet the goods and wash them of contaminants. Modules 2–12 are used to separate and clean the paper and plastic components and pulp the paper component. Modules 13–17 are used to rinse and condition the components, to fierter separate the paper component from the plastic component, and to flirther pulp the paper component. Modules 18–20 are used to separate the pulp from the plastic by causing the pulp to exit the washing machine.

Water and chemicals can be introduced into each module in order to maintain the desired wash liquor make-up. In general, the wash liquor counter flows from module 17 back to module 1, wherein the wash liquor is drained out of the washing machine. Each module is provided with a mechanism that allows adjustment of the water level therein. Such a mechanism is typically a weir. In general, the water level increases from the load end of the washing machine toward the exit end. For example, the water level in module 2 could be 2–8 inches, while the water level in module 17 could be 13 inches. In addition, steam can be introduced into each module in order to obtain, and maintain, high temperatures. The steam is introduced at the bottom of the module. Water is introduced into each of water 18–20. The module exits the washing machine from each of modules 18–20. Counter flow is not used in these last modules in order to recover the pulp. The water that is introduced into the modules is provided by the holding tank 325B.

The present invention has several advantages in processing packaging and other multi-layer goods over prior art methods which utilize hydrapulpers. The operating cost of the present invention is lower than with conventional hydrapulpers. One reason for this is the energy requirements for a washing machine are much lower than for a hydrapulper. The horsepower to rotate the baskets is much less than the energy requirements for a hydrapulper. Also, much less water is used. In a hydrapulper, the goods are immersed in a bath of water and chemicals. With the present invention, the basket drops the goods in and out of the wash liquor in the bottom of each module. Furthermore, the present invention preserves the fiber length of the paper fibers. Hydrapulpers, which utilize beating actions for pulping, shorten the fiber length. For example, one measure of fiber length is Canadian Standard Freeness (CSF). Using the same type of goods juice, milk cartons), pulp fibers obtained with the present invention had a CSF of 631 millimeters, after a processing time of 90 minutes, while pulp fibers obtained with a hydrapulper, after a processing time of 25 minutes, had a CSF of 254 millimeters. These shorter pulp fibers had a mushy consistency.

The foregoing disclosure and the showings made in the drawings are merely illustrative of the principles of this invention and are not to be interpreted in a limiting sense.

What is claimed is:

1. A method for recycling materials from disposed products, said disposed products comprising cellulose materials and noncellulose materials, said noncellulose materials comprising plastic material comprising the steps of:
   a) providing a first washing machine and a second washing machine, the first washing machine being a continuous batch washing machine;
   b) loading said disposed products, water, and alkali into said first washing machine, said water and alkali forming a first wash liquor;
   c) washing said disposed products in said first washing machine by agitating said load of disposed products in said first wash liquor so as to separate said cellulose material from said noncellulose material;
   d) draining said cellulose material and water out of said first washing machine, while retaining said noncellulose material in said first washing machine;
   e) continuing to wash said noncellulose material with water in said first washing machine until said noncellulose material is clean, wherein said noncellulose material is removed from said first washing machine;
   f) transferring said cellulose material to said second washing machine and loading said cellulose material into said second washing machine;
   g) washing said cellulose material with a second wash liquor that comprises water and alkali in said second washing machine until said cellulose material is cleaned, wherein said cellulose material is removed from said second washing machine.

2. The method of claim 1 wherein the step of loading said disposed products into said first washing machine frter comprises the step of loading either disposed diapers, disposed food containers or disposed corrugated boxes.

3. The method of claim 1 wherein the respective steps of washing in said first and second washing machines firher comprise the respective steps of rotating a respective basket inside of said first and second washing machines so as to provide said agitation.

4. The method of claim 1 wherein the respective steps of washing in said first and second washing machines further comprise the respective steps of blowing in air from the outsides of said first and second washing machines to respective interiors of said first and second washing machines so as to agitate the contents thereof.

5. The method of claim 1 wherein the respective steps of washing in said first and second washing machines further comprise the respective steps of injecting ozone into the respective interiors of said first and second washing machines.

6. The method of claim 1 wherein the step of draining said cellulose material and water out of said first washing machine fiuther comprises the step of passing said cellulose material and said water through a screen having openings which are sized so as to retain said noncellulose material.

7. The method of claim 1 fiurier comprising the step of draining said water from said cellulose material after said cellulose material has been washed in said second washing machine, by passing said water through a second screen having openings which are sized so as to retain said cellulose material.

8. The method of claim 1 wherein the step of continuing to wash said noncellulose material in said first washing machine comprises the step of providing sand in said first washing machine so as to wash said noncellulose material with said sand.

9. The method of claim 1 wherein the step of transferring said cellulose material to said second washing machine comprises pumping a mixture formed by said cellulose material and water to said second washing machine.

10. The method of claim 1, wherein:
    a) the step of loading said disposed products into said first washing machine further comprises the step of loading either of disposed diapers, disposed food containers or disposed corrugated boxes;
    b) each of the respective steps of washing in said first and second washing machines further comprise the steps of rotating a respective basket inside of said respective first and second washing machines, blowing in air from the outsides of said respective first and second washing machines to respective interiors of said first and second washing machines so as to agitate the contents thereof, and injecting ozone into the respective interiors of said first and second washing machines;
    c) the step of draining said cellulose material and water out of said first washing machine friher comprises the step of passing said cellulose material and said water through a screen having openings which are sized so as to retain said noncellulose material;

d) draining said water from said cellulose material after said cellulose material has been washed in said second washing machine, by passing said water through a second screen having openings which are sized so as to retain said cellulose material;

e) the step of continuing to wash said noncellulose material in said first washing machine comprises the step of providing sand in said first washing machine so as to wash said noncellulose material with said sand;

f) the step of transferring said cellulose material to said second washing machine comprises pumping a mixture formed by said cellulose material and water to said second washing machine.

11. The method of claim 1 wherein the first and second wash liquors each comprise a surfactant.

12. The method of claim 1 wherein the substantially unpulped disposed products comprise milk cartons.

13. A method of processing materials from substantially unpulped disposed products, said products having several layers of said materials comprising paper and nonpaper bonded together, comprising the steps of:

a) providing a washing machine having a first module and a first basket having openings therein which is rotatable in the first module, said openings being in a periphery of said first basket and having a second module located adjacent to the first module, the second module having a second basket therein, the second basket having openings in a periphery thereof and being rotatable in the second module;

b) introducing water and an alkali into said first basket;

c) loading said substantially unpulped disposed products into said first basket;

having a second basket therein, the second basket having openings in a periphery thereof and being rotatable in the second module;

b) introducing water and an alkali into said first basket;

c) loading said substantially unpulped disposed products into said first basket;

d) rotating said first basket into which said substantially unpulped disposed products have been loaded inside of said first module so as to move said first basket periphery through said water and so as to agitate said substantially unpulped disposed products, thus causing separation of said paper material from said nonpaper material and pulping of said paper material;

e) transferring the pulped paper material and the nonpaper material in said first basket into the second basket;

f) rotating the second basket so as to further agitate the pulped paper material and the nonpader material;

g) removing said pulped paper material from the second basket through said second basket openings while retaining said nonpaper material therein.

14. The method of claim 13 wherein said step of providing a washing machine having a first module and a first basket having openings therein which is rotatable in said first module further comprises the step of providing ribs in said first basket, said ribs having sharp edges thereon to penetrate the nonpaper material during rotation.

15. The method of claim 14 wherein said openings are first openings, wherein:

a) the step of providing ribs in said first basket further comprises the step of providing second openings in said ribs with the sharp edges being located around perimeters of said second openings;

b) the step of rotating said first basket so as to agitate said substantially unpul ed disposed products further comprises the step of passing at least portions of said substantially unoulped disposed products through said second opemngs so as to wet said layers of said materials.

16. The method of claim 13 wherein said first basket openings are formed by perforations having inwardly projecting sharp edges about said openings to penetrate the nonpaper during rotation.

17. The method of claim 13 wherein said paper is of a wet strength material.

18. The method of claim 13 wherein the nonpaper material includes at least one layer of metal.

19. The method of claim 13 wherein the nonpaper material includes at least one of plastic.

20. The method of claim 19 wherein the nonpaper material includes at least one layer of metal.

21. The method of claim 13 wherein:

a) the substantially unpulped disposed products comprise an outer layer of plastic and an inner layer of paper;

b) piercing the outer layer of plastic with sharp edges located on the first basket during the step of rotating said first basket, so as to allow the wetting of the inner layer of paper.

22. The method of claim 13 wherein the step of rotating said first basket further comprises the step of rotating said first basket in an oscillating manner.

23. The method of claim 13 wherein the disposed products comprise drink boxes.

24. The method of claim 13 further comprising the step of removing a portion of said pulped papat material from the first basket through the first basket openings before transferring the contents of the first basket into the second basket.

25. A method of recycling materials from cellulose and non-cellulose materials, comprising the steps of:

a) providing first and second washing machines;

b) cleaning said cellulose and non-cellulose materials in said first washing machine using water, alkali and a surfactant;

c) removing said cellulose material from said first washing machine;

d) cleaning said cellulose material in said second washing machine using water, alkali and a surfactant;

e) continuing to clean said non-cellulose material in said first washing machine, after said cellulose material has been removed therefrom, using an abrasive material;

f) injecting ozone into said first and second washing machines during said cleaning steps to increase agitation.

26. A method of processing disposed products for recycling, the disposed products comprising cellulose materials and noncellulose materials, said noncellulose materials comprising waste material, comprising the step of:

a) providing a washing machine, said washing machine comprising a first chamber with a first basket located inside of the first chamber and a second chamber with a second basket located inside of the second chamber, the second chamber being located adjacent to the first chamber;

b) loading the disposed products and water into the first basket;

c) adjusting the pH of the disposed products and water mixture in the first basket by adding an alkali;

d) rotating the first basket so as to agitate the disposed products located therein, thus causing the separation of the waste material from the cellulose materials and the noncellulose materials;

e) removing the waste material and water from the first basket through perforations in the first basket;

f) transferring the cellulose materials and the noncelluose materials from the first basket to the second basket;

g) providing water in the second basket;

h) rotating the second basket inside of the second chamber so as to agitate the cellulose materials and the noncellulose materials inside of the second basket; thus causing separation of cellulose materials from the noncellulose materials and causing the cellulose materials to pulp;

i) removing the pulped cellulose materials and water from the second basket through perforations in the second basket.

27. A method of processing disposed products for recycling, the disposed products comprising cellulose materials and noncellulose materials, comprising the steps of:

a) providing a washing machine having a plurality of perforated baskets, each of the baskets being rotatable inside of a respective chamber, the baskets being connected in-line with each other so as to form a tunnel;

b) loading the disposed products and water into a first one of the baskets;

c) adjusting the pH of the disposed products and water mixture in the first basket by adding an alkali;

d) rotating the first basket inside of the respective first basket chamber so as to agitate the disposed products located therein;

e) transferring the disposed products from the first basket to an adjacent second one of the baskets;

f) providing additional water and alkali in the second basket;

g) rotating the second basket inside of the respective second basket chamber so as to agitate the disposed products therein;

h) continuing to transfer the disposed products to a next adjacent one of the baskets and rotating the adjacent basket inside of the respective basket chamber so as to agitate the disposed products therein, thus causing separation of the cellulose materials from the noncellulose materials and causing the cellulose materials to pulp;

i) after the cellulose materials have been pulped, removing the pulped cellulose materials from the respective baskets through perforations in the baskets.

28. The method of claim 27 wherein the steps of rotating the first basket, the second basket, and the adjacent basket further comprises the step of rotating all of baskets in the washing machine together.

29. The method of claim 27 wherein said baskets have scoopes that are arranged to transfer said disposed products to an adjacent basket, and the disposed products are transferred to an adjacent one of the baskets by said respective scoop.

30. The method of claim 29 wherein said scoops are perforated and the steps of transferring the disposed products from the first basket to the second basket and continuing totransfer the disposed products to a next adjacent one of the baskets further comprises the step of transferrring the disposed products from one basket to the next adjacent basket while leaving the water in the one basket.

31. A method of processing materials from disposed products containing cellulose material and noncellulose material, comprising the steps of:

a) providing a washing machine having a perforated basket located therein, said basket having ribs located therein, said basket being inside of a chamber;

b) loading said disposed products and water into said basket, said water forming a wash liquor in a bottom of said basket and said chamber;

c) adjusting a pH of the wash liquor by adding an alkali to the wash liquor;

d) rotating said basket inside of said chamber so as to move a portion of said basket and the products therein through the water and so as to lift said products with the ribs and then allowing the products to drop from the ribs directly down to the wash liquor, thus causing said cellulose material to separate from said noncellulose material;

e) draining said cellulose material from said basket through said perforations and then from the chamber while retaining said noncellulose material in said basket;

f) the step of rotating said basket further comprises the step of rotating said basket first in one direction and then rotating said basket in the reverse direction from said one direction.

32. In a method of processing materials from disposed products having several layers of said materials comprising paper and nonpaper bonded together, through the use of a continuous batch washing machine including a series of modules, with each module having an open ended perforated basket rotatable therein, with the baskets ananged in end to end relation and having means by which a batch in each may be transferred into a subsequent basket through their ends in response to a predetermined sequence of rotation thereof, the steps of:

a) introducing water and an alkali into the first and subsequent modules of a process zone of the machine to form a bath of wash liquor in the baskets thereof;

b) loading successive batches of the disposed products into a first basket of said process zone;

c) rotating said first basket and successive baskets of said process zone so as to wet and clean the batch in the wash liquor thereof and agitate the batch to cause the paper and nonpaper layers to separate and pulp said paper;

d) draining wash liquor from the module or modules of the process zone and replacing it with a bath of wash liquor from the basket next-closest to an outlet, thus causing the wash liquor in the modules to flow in counter-flow relation to the batch;

e) rotating each such basket in the process zone in said predetermined sequence to transfer the separated layers therein into a subsequent basket of the process zone and to transfer the separated layers in the last basket of the process zone into a basket of a subsequent separation zone of the machine;

f) introducing water into the module of the basket of the separation zone of the machine to form a bath of rinse liquor in the basket;

g) rotating the basket of the separation zone to cause the separated layers to be rinsed in the water thereof, and h) separately removing non-paper layers and pulped paper from the basket of the separation zone.

33. A method of processing materials from disposed products, the disposed products comprising cellulose material and noncellulose material, comprising the steps of:

a) loading the disposed products into a perforated basket of a washing machine, the basket being located in a chamber;
b) providing a wash liquor in a bottom portion of the basket and the chamber;
c) washing the disposed products in the wash liquor by rotating the basket inside of the chamber in an oscillating manner and through the wash liquor so as to agitate the disposed products and causing the cellulose material to separate from the noncellulose material;
d) removing the cellulose material from the basket through the basket perforations while retaining at least a portion of the noncellulose material in the basket;
e) unloading the retained portion of the noncellulose material from the washing machine.

34. A method of processing materials from disposed products, the disposed products comprising cellulose material and noncellulose material, comprising the steps of:
a) providing a plurality of perforated baskets in a washing machine, the baskets being connecting in-line with each other so as to form a tunnel, the baskets being in respective chambers;
b) loading the disposed products into a first one of the baskets of the washing machine;
c) providing a bath in a bottom portion of each of the baskets;
d) washing the disposed products in the respective baths by rotating the baskets inside of the respective chambers and through the respective baths so as to agitate the disposed products and/or the cellulose and noncellulose materials located therein and causing the cellulose material to separate from the noncellulose material;
e) periodically transferring the disposed products and/or the cellulose and noncellulose materials from a one basket to a next adjacent basket;
f) removing the cellulose material from the respective baskets through the perforations in the baskets, while retaining at least a portion of the noncellulose material in the baskets;
g) unloading the retained noncellulose material from a last one of the baskets.

35. A method of processing materials from disposed products, the disposed products comprising cellulose material and noncellulose material, the cellulose material is in an unpulped form, the noncellulose material comprises plastic that forms a covering on the unpulped cellulose material, comprising the steps of:
a) loading the disposed products into a perforated basket of a washing machine, the basket being located in a chamber;
b) providing a wash liquor in a bottom portion of the basket and the chamber;
c) washing the disposed products in the wash liquor by rotating the basket inside of the chamber and through the wash liquor so as to agitate the disposed products, and penetrating the plastc so as to wet the cellulose material during the washing of the disposed products, and causing the cellulose-material to separate from the noncelluose material;
d) pulping the cellulose material by rotating the basket so as to agitate the disposed products in the wash liquor before the cellulose material is removed from the basket, the disposed products being lifted out of the wash liquor and then dropped back into the wash liquor;
e) removing the cellulose material from the basket through the basket perforations while retaining at least a portion of the noncellulose material in the basket;
f) unloading the retained portion of the noncellulose material from the washing machine.

36. The method of claim 35 wherein the unpulped cellulose material comprises a wet strength resin, further comprising the step of cleaning the wet strength resin from the cellulose material by rotating the basket so as to agitate the disposed products in the wash liquor.

37. A method of processing materials from disposed products, the disposed products comprising cellulose material and noncellulose material, comprising the steps of:
a) providing a plurality of perforated baskets in the washing machine, the baskets being located in respective chambers, the baskets being connecting in-line with each other so as form a tunnel;
b) loading the disposed products into a first one of the baskets of the washing machine;
c) providing a bath in a bottom portion of each of the baskets and the respective chambers;
d) periodically transferring the disposed products and/or the cellulose and noncellulose materials from one of the baskets to a next adjacent basket, and transferring the bath of the next adjacent basket to the one basket;
e) washing the disposed products in the wash liquor by rotating the baskets in an oscillating manner inside of the respective chambers through the respective baths so as to agitate the disposed products causing the cellulose material to separate from the noncellulose material;
f) removing the cellulose material from the respective baskets through perforations in the baskets, while retaining at least a portion of the noncellulose material in the baskets;
g) unloading the retained noncellulose material from the washing machine.

* * * * *